United States Patent [19]
Takasaki et al.

[11] Patent Number: 5,963,308
[45] Date of Patent: Oct. 5, 1999

[54] DISTANCE MEASURING APPARATUS

[75] Inventors: Minoru Takasaki, Yokohama; Yukihiro Matsumoto, Kawaguchi, both of Japan

[73] Assignee: Canon Kabushiki Kaisha, Tokyo, Japan

[21] Appl. No.: 08/801,520

[22] Filed: Feb. 18, 1997

[30] Foreign Application Priority Data

Feb. 20, 1996 [JP] Japan ..................................... 8-032510
Feb. 20, 1996 [JP] Japan ..................................... 8-032512
Feb. 20, 1996 [JP] Japan ..................................... 8-032513

[51] Int. Cl.$^6$ .............................. G01C 3/00; G03B 13/00; H01L 31/14
[52] U.S. Cl. ......................... 356/3.01; 396/106; 356/3.03; 356/3.08; 250/201.6; 250/552
[58] Field of Search ................................. 356/3.01, 3.13, 356/4.01; 396/106; 250/201.6, 552

[56] References Cited

U.S. PATENT DOCUMENTS

| | | |
|---|---|---|
| 4,291,223 | 9/1981 | Sakane et al. . |
| 4,643,564 | 2/1987 | Lofgren et al. ........................ 356/5.05 |
| 4,693,597 | 9/1987 | Shiomi et al. . |
| 4,701,048 | 10/1987 | Tokuda et al. . |
| 4,720,723 | 1/1988 | Harunari et al. . |
| 4,959,755 | 9/1990 | Hochstein . |

*Primary Examiner*—Stephen C. Buczinski
*Attorney, Agent, or Firm*—Morgan & Finnegan, LLP

[57] ABSTRACT

In a distance measuring apparatus for measuring the distance to an object on the basis of reflected light obtained as a result of projecting light toward the object, in the case of an active distance measurement operation, the flickering frequency of a light beam projected from a light projection unit (B) toward the object (A) is prolonged within the range in which charges obtained by a signal charge supply unit (C) are not saturated in a circulating shift register (E). When the flickering period is longer than a predetermined period, a distance measurement operation inhibition unit (L) inhibits transition to a passive distance measurement operation.

27 Claims, 34 Drawing Sheets

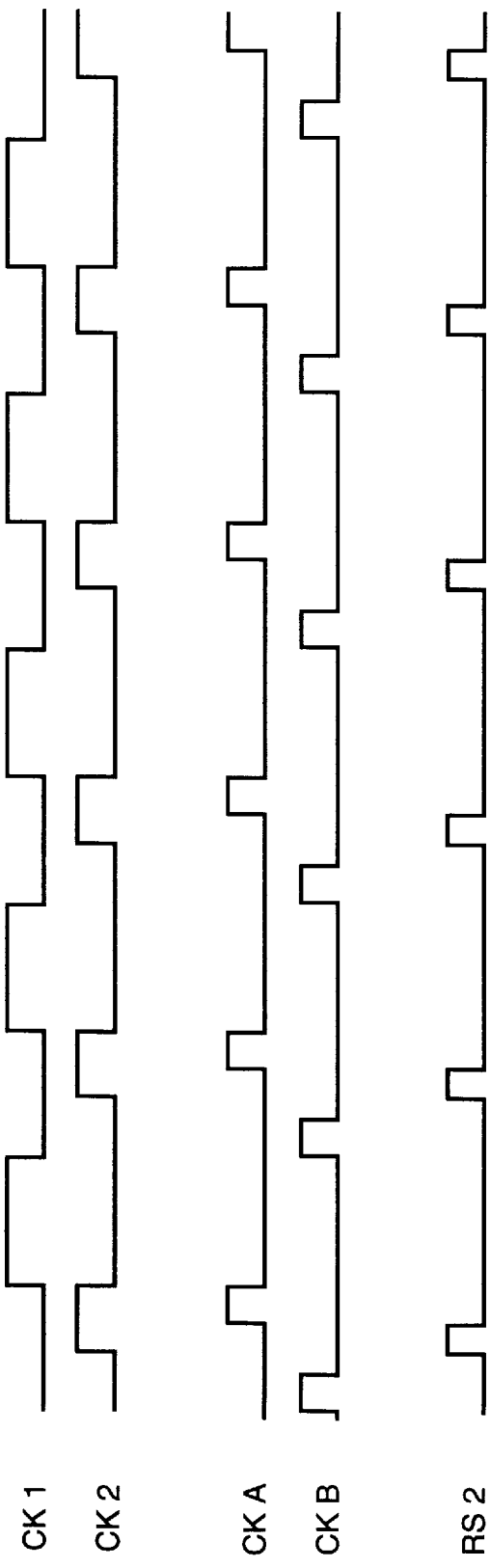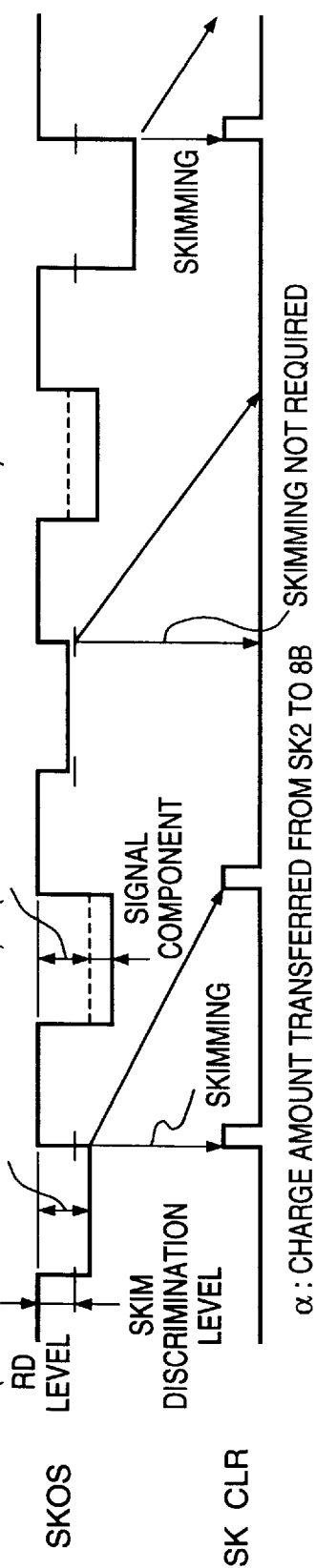
FIG. 9

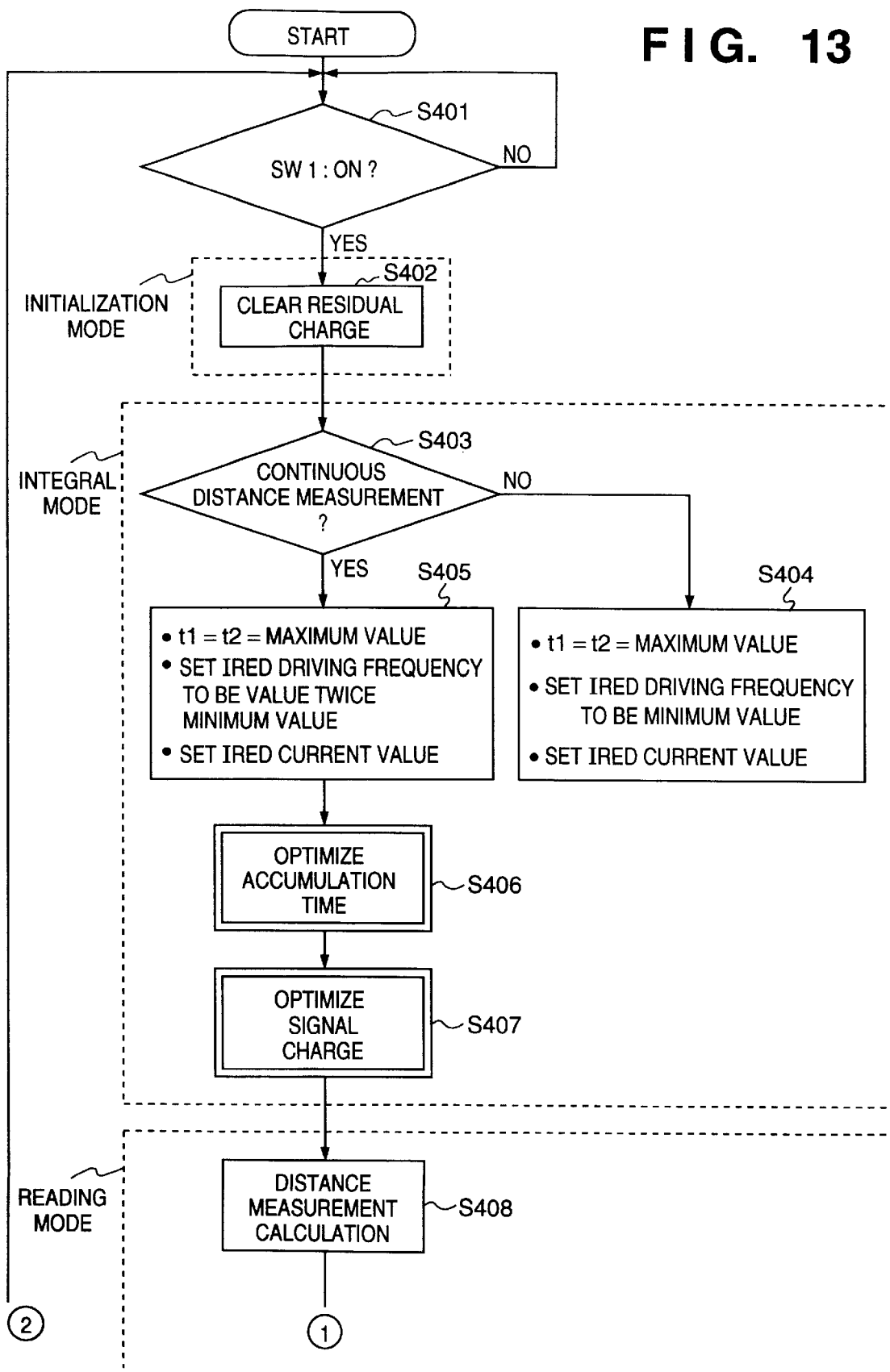

* ON PIXEL ACCUMULATES CHARGE
  CORRESPONDING TO
  (IRED + EXTERNAL LIGHT)
  COMPONENTS

OFF PIXEL ACCUMULATES CHARGE
CORRESPONDING TO
EXTERNAL LIGHT COMPONENT

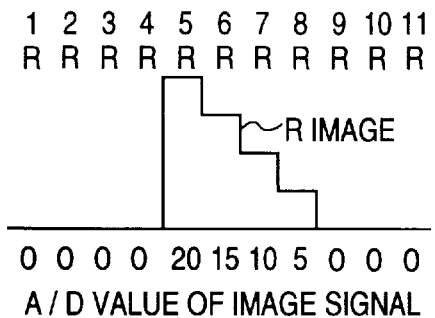
F I G. 33A
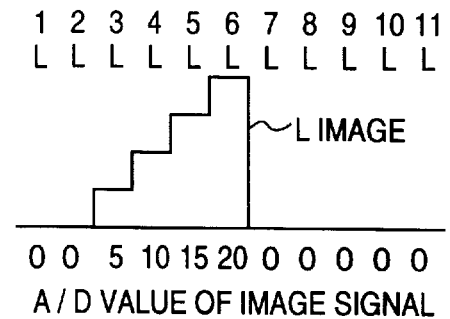
F I G. 33B
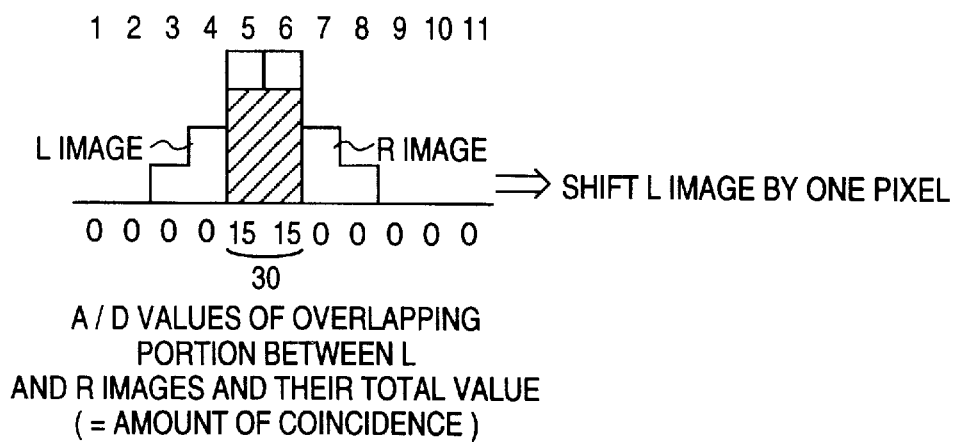
F I G. 33C

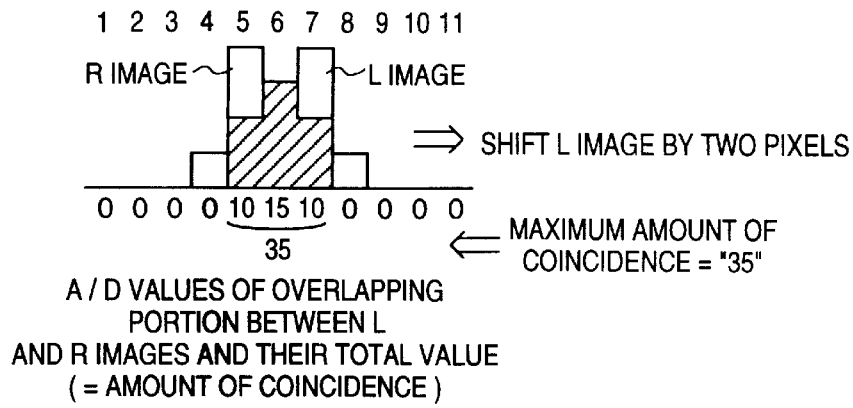
F I G. 33D
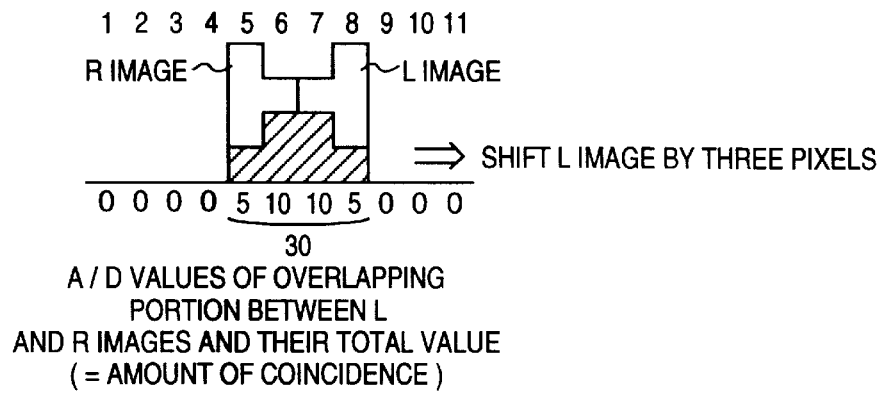
F I G. 33E
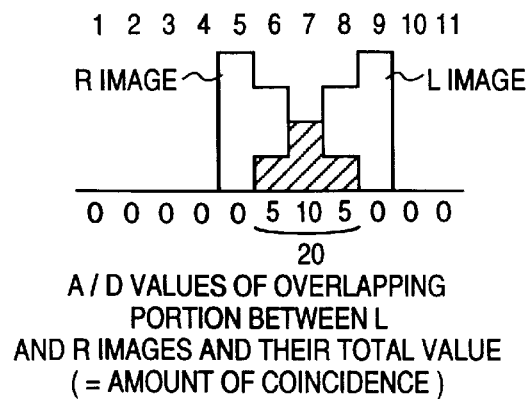
F I G. 33F

DISTANCE MEASURING APPARATUS

BACKGROUND OF THE INVENTION

The present invention relates to a distance measuring apparatus for measuring the distance to an object to be measured and, more particularly, to a distance measuring apparatus suitably used for the AF function of a camera.

Conventionally, Japanese Patent Publication No. 5-22843 has proposed skimming that uses a ring-shaped charge transfer portion to integrate signals and to also remove external light. FIGS. 26 to 29 are a schematic diagram, timing chart, and the like of an image sensing element (to be referred to as a skim CCD hereinafter) using skimming.

FIG. 26 is a schematic diagram illustrating the structure of the skim CCD, which, in this case, has three photoelectric conversion elements. In this skim CCD, a light-emitting element such as an IRED 1014 is caused to flicker in a pulse pattern to project light pulses onto the object to be measured. Light-receiving (photoelectric conversion) elements 1020 generate charges corresponding to the amounts of received light.

The skim CCD allows distance measurements in two modes, i.e., an active mode in which the reflected light is received and photoelectrically converted by the light-receiving elements 1020 and the photoelectrically converted charge signals are accumulated, and a passive mode in which the IRED 1014 does not emit light and charges corresponding to only external light are accumulated. The skim CCD is a hybrid type distance measuring apparatus which starts a passive distance measurement operation when a reliable distance measurement result cannot be obtained in an active distance measurement operation.

Each light-receiving sensor (element) 1020 corresponds to a pair of ON and OFF pixels 1022 and 1023, and a charge accumulated by each light-receiving sensor 1020 is transferred to the corresponding ON or OFF pixel 1022 or 1023. Thereafter, the charge is transferred to a ring 1021.

FIG. 27 is a timing chart showing the charge transfer timings. As shown in FIG. 27, the charge accumulated in each sensor 1020 during the High (ON) period of an accumulation time signal is transferred to the corresponding ON pixel 1022 in synchronism with a High ON pixel transfer signal.

On the other hand, the charge accumulated in each sensor 1020 during the Low (OFF) period of the accumulation time signal is transferred to the corresponding OFF pixel 1023 in synchronism with a High OFF pixel transfer signal.

After charges accumulated in pixels X, Y, and Z are transferred to the corresponding ON and OFF pixels 1022 and 1023, the pixel data are transferred to the ring 1021 in synchronism with a High ring transfer signal. The ring transfer signal is synchronously output so that ON pixels X are added to each other.

In the active distance measurements, an IRED terminal (not shown) is turned on/off in synchronism with the accumulation time signal. In the passive distance measurements, the IRED terminal is kept OFF irrespective of the accumulation time signal. Note that numerals 1, 2, and 3 in FIG. 27 indicate the numbers of rounds on the ring, and correspond to one, two, and three rounds on the ring shown in FIG. 28.

The charge accumulation amount per round can be adjusted by adjusting the accumulation time or the driving frequency of the skim CCD. Note that the accumulation time can be used for decreasing the charge accumulation amount of each ON pixel since the ratio of High/Low periods of the accumulation time signal can be determined by communications from, e.g., a microcomputer 2001 shown in FIG. 17 (to be described later) to a sensor control unit 2008.

Also, since the accumulation time signal is generated by frequency-dividing the driving frequency of the skim CCD, the accumulation time of each ON/OFF pixel per round can be shortened by increasing the driving frequency.

On the other hand, by decreasing the driving frequency, the accumulation time of each ON/OFF pixel per round can be prolonged, and consequently, the charge accumulation amount per round can be increased.

FIG. 28 shows the charge accumulation amount per round on the ring, and also shows the states wherein the respective charge accumulation amounts are added to each other as the number of rounds on the ring increases. The number of rounds on the ring indicates the number of transfers of pixel signals to the ring. One round on the ring represents that the accumulated charge is transferred only once, and accumulation is also performed only once. Three rounds on the ring represent that accumulation is performed three times, and the ring stores the sum total of accumulated charges obtained by the three accumulations.

When the signal charge obtained per round on the ring does not have a sufficient level, the number of times of accumulation is increased to sequentially add signal charges so as to obtain a signal charge with a high S/N ratio.

Table 1 below briefly summarizes the features and merits of the active and passive distance measurement methods.

TABLE 1

|  | Suited Object | Suited Object Distance | Suited Luminance |
| --- | --- | --- | --- |
| Active | Object with high reflectance | from near distance to middle distance (several m) | from about EV3 to EV14 |
| Passive | Object with high contrast | from several m to far distance | from about EV8 to EV18 |

As shown in Table 1 above, the active distance measurement method is good for a near, high-reflectance object, and distance measurements from a low-luminance, dark place to a relatively high-luminance place, and the passive distance measurement method is good for a far, high-contrast object and distance measurements in a bright place.

For this reason, in the prior art, in order to shorten the distance measurement time, the driving frequency of the skim CCD is changed between the active and passive distance measurement methods so as to ignore distance measurements in a dark place that often produces distance measurement results with low reliability.

FIG. 29 is a flow chart showing the conventional AF sequence.

As shown in FIG. 29, when the AF operation starts in the first step S501, the active distance measurement mode is set in step S502. In step S503, it is checked if the current mode is the active or passive mode. As a result of checking, if the current mode is the active mode, the initial value of the driving frequency (fc) is set to be 500 kHz in step S504; if the current mode is the passive mode, the initial value of the driving frequency (fc) is set to be 1 MHz in step S513.

In step S505, an ICG (Integration Clear Gate) mode is executed at the selected driving frequency and by driving to flicker a light projection unit such as an IRED if the active mode is selected. In the ICG mode, external light components incident on the skim CCD are measured to change the accumulation conditions such as the driving frequency, accumulation time, and the like, so as to accumulate charges under optimal conditions without saturating the skim CCD.

The ICG mode will be described later with reference to FIG. 30.

After the driving frequency, accumulation time, and the like are determined in the ICG mode, the maximum number of rounds on the ring for accumulation is set in step S506, and the flow then advances to step S507 to execute the integral mode.

The maximum number of rounds on the ring for accumulation is set to forcibly end the integral mode after charges are accumulated up to the maximum number of rounds on the ring for accumulation when the amount of light incident on the skim CCD is small and the obtained signal is not enough to perform distance measurement calculations (mainly, low-luminance, low-reflectance, far-distance objects, and the like).

When the integral mode has ended after charges are accumulated in sufficient amount or accumulation is repeated by the maximum number of rounds on the ring for accumulation, the flow advances to step S508 to execute the reading mode. In the reading mode, charges obtained in the integral mode are A/D-converted, and the converted data is stored in a memory of a microcomputer.

Thereafter, the object distance is calculated based on the obtained image data in step S509. After calculations, it is checked in step S510 if the current mode is the active or passive mode.

If the current mode is the active mode, the passive mode is set in step S514. More specifically, the light projection unit is turned off, and thereafter, the same operation as in the active mode is performed to calculate the object distance.

After the object distances are calculated using both the active and passive modes, as described above, the flow advances to step S511 to perform a distance measurement result selection calculation so as to select one of the active and passive distance measurement results. Thereafter, the AF operation ends in step S512.

The ICG mode will be explained below.

FIG. 30 is a flow chart showing the sequence executed in the conventional ICG mode.

When the ICG mode starts in the first step S601, communications are made with a skim CCD such as a skim CCD 2024 shown in FIG. 17 (to be described later). The charge accumulation time and other accumulation conditions of the skim CCD can be changed by communicating with the skim CCD, and communication data are set to obtain the longest accumulation time as the initial value of the accumulation time.

After the communications are complete, the residual charges in the skim CCD are cleared in step S603. In step S604, charge accumulation is started, and at the same time, a signal SKOS output from the skim CCD is monitored.

Since this signal SKOS is inverted when a charge transfer channel has reached saturation during charge accumulation in the ICG mode, whether or not the current charge accumulation conditions are proper can be discriminated by monitoring the time required until the signal SKOS is inverted.

During the accumulation, it is checked in step S605 if the signal SKOS is inverted. If the signal SKOS is inverted, the number of rounds (time period) on the ring required until the signal SKOS is inverted is checked in step S608. If the count value (time period) until the signal SKOS is inverted is equal to or larger than a predetermined value (assumed to be four rounds in the flow chart), the flow advances to step S607 to end the ICG mode.

On the other hand, if the count value is smaller than the predetermined value (four rounds) in step S608, the current accumulation time is checked in step S609. If the current accumulation time is not the shortest time, the accumulation time is shortened in step S610 to repeat the ICG mode again.

If the current accumulation time is shortest, the flow advances to step S607 to end the ICG mode.

If it is determined in step S605 that the signal SKOS is not inverted, the current number of rounds on the ring for accumulation is checked in step S606. If the current number of rounds on the ring for accumulation has not reached the maximum number of rounds on the ring for accumulation yet, accumulation is repeated; otherwise, the flow advances to step S607 to end the ICG mode and to start the next integral mode.

However, in the above-mentioned prior art, during the process of injecting signal charges generated by a plurality of photoelectric conversion elements from a signal charge injection unit into a charge transfer channel via a signal charge supply unit, some signal charges are omitted to lower the far-distance measurement performance of the distance measuring apparatus considerably.

In the active distance measurement operation which receives light and performs accumulation when light beam pulses projected toward the object to be measured are reflected by the object to be measured and return to the apparatus, and calculates the distance to the object to be measured using the accumulated signal charges, when a reliable distance measurement result cannot be obtained in an active distance measurement operation, the distance measurement mode is switched to a passive distance measurement operation. However, when the distance measurement mode is switched to a passive distance measurement operation in a dark situation in which the luminance of the object to be measured and its surrounding portion is very low, the distance measurement time is nonsensically prolonged.

In the active distance measurement method, the maximum possible current is often supplied to an IRED (light-emitting diode) serving as a light projection unit that broadens the distance measurement range in the far-distance direction. However, when the flickering period of the IRED is set to be too long, heat produced by the current supplied through the IRED intermittently exceeds an allowable value, and the IRED deteriorates gradually.

As is generally known, when the driving frequency of the skim CCD is relatively low, good performance can be obtained in respect of the transfer efficiency of accumulated charges and the dark current. In this case, when the amount of incident light is large (under a high-luminance condition or the like), the charge transfer channel is readily saturated.

Conversely, when the driving frequency is high, the charge transfer channel is hard to be saturated but has poor transfer efficiency. As a consequence, signal components readily deteriorate.

FIG. 31 illustrates the influences of the driving frequency of the skim CCD and the number of rounds on the ring for accumulation on the accumulated charge amount. As can be seen from FIG. 31, the charge amount accumulated at a low driving frequency via a small number of rounds on the ring is the same as that accumulated at a high driving frequency via a large number of rounds on the ring.

However, in the prior art, since the maximum number of rounds on the ring for accumulation is constant independently of the driving frequency, if the maximum number of rounds on the ring for accumulation is set with reference to a high frequency, an extra accumulation time is required, and an over-specification problem is posed.

On the other hand, if the maximum number of rounds on the ring for accumulation is set with reference to a low frequency, a sufficient image signal cannot be obtained when the frequency is high.

In view of these problems, in the prior art, when the amount of incident light is large (high reflectance, high luminance), the driving frequency of the skim CCD is set to be a fixed value to prevent accumulated charges from being saturated, and the accumulation time is varied (electronic shutter function) in correspondence with the amount of incident light.

However, when the driving frequency is fixed and the charge accumulation time is decreased in correspondence with increases in amount of incident light, saturation of accumulated charges cannot be avoided depending on the selected driving frequency when the amount of incident light is large, and distance measurement calculations cannot be made.

Also, when the amount of incident light is small, signal components high enough to perform distance measurement calculations cannot be obtained, or signal components obtained based on light emitted by the IRED are buried in external light components. Furthermore, depending on the transfer efficiency upon transferring charges from the sensors to the ring, signal components obtained based on light emitted by the IRED are buried, and the S/N ratio is impaired, thus disturbing the distance measurement calculations.

In general, when the skim CCD is driven at a low driving frequency, it can assure high transfer efficiency of accumulated charges and can become strong against dark currents. However, in such case, if the amount of incident light is large (under a high-luminance condition), the charge transfer channel is readily saturated. Conversely, when the skim CCD is driven at a high driving frequency, the transfer efficiency of the charge transfer channel is impaired, and signal components tend to deteriorate.

Furthermore, since the conventional apparatus does not take the performance or characteristics of the active and passive modes described in Table 1 above into consideration, and drives the skim CCD at a low driving frequency as in the active mode so as to measure the distance to a low-luminance or low-contrast object that the passive mode is not good at, the distance measurement time becomes redundant, and only an unreliable distance measurement result is obtained.

SUMMARY OF THE INVENTION

The present invention has been made in consideration of the above-mentioned problems and has as its object to provide a distance measuring apparatus that can prevent decreases in distance measurement performance with respect to the object to be measured present at a far-distance position.

It is another object of the present invention to provide a distance measuring apparatus which can prevent the distance measurement time from being senselessly prolonged when the distance measurement mode is switched to the passive distance measurement mode in a dark situation.

It is still another object of the present invention to provide a distance measuring apparatus which can maximally utilize its far-distance measurement performance.

It is still another object of the present invention to provide a distance measuring apparatus which can prevent the temperature of light projection means from rising up to a temperature that may cause deterioration.

It is still another object of the present invention to provide a distance measuring apparatus which can obtain image signals of sufficiently high level independently of the driving frequency selected.

It is still another object of the present invention to provide a distance measuring apparatus which can optimize signal charge accumulation while preventing saturation of charges.

It is still another object of the present invention to provide a distance measuring apparatus which can decrease the release time lags while obtaining a reliable distance measurement result.

In order to achieve the above objects, a distance measuring apparatus according to the present invention comprises the following features.

That is, a distance measuring apparatus, which comprises light projection means driven to flicker and project light beam pulses onto an object, and distance measuring means for measuring a distance to the object on the basis of reflected light obtained by projecting the light beam pulses onto the object, comprises:

flickering period changing means for changing a flickering period of the light projection means in accordance with a situation of the object.

The distance measuring apparatus preferably further comprises photoelectric conversion means, signal charge integral means, signal charge supply means, signal charge injection means, and a circulating shift register, the photoelectric conversion means comprises a plurality of photoelectric conversion elements for photoelectrically converting the light beam pulses consequently obtained when the light beam pulses projected from the light projection means are reflected by the object, and outputting signal charges, the signal charge integral means integrates the signal charges respectively output from the plurality of photoelectric conversion elements, the signal charge supply means transfers the signal charge integrated by the signal charge integral means to the signal charge injection means in accordance with a predetermined pulse, the signal charge injection means injects the signal charge transferred by the signal charge supply means into the circulating shift register, the circulating shift register accumulates the signal charge injected from the signal charge injection means, and the distance measuring means calculates the distance to the object on the basis of the signal charge accumulated in the circulating shift register.

For example, the distance measuring means can operate in one of an active mode for measuring distance by driving the light projection means to emit light, and a passive mode for measuring distance without driving the light projection means to emit light, and the apparatus preferably further comprises inhibition means for, when the flickering period of the light projection means is longer than a predetermined period, inhibiting transition to the passive mode.

The distance measuring apparatus preferably further comprises maximum current limiting means for limiting a maximum value of a current to be supplied to the light projection means in accordance with the flickering period changed by the flickering period changing means.

The distance measuring apparatus preferably further comprises:

continuous operation setting means for continuously operating the distance measuring means; and flickering frequency limiting means for, when the continuous operation setting means sets to continuously operate the distance measuring means, inhibiting a flickering frequency of the light projection means from being set to be lower than a predetermined value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a timing chart for explaining the operation sequence of the circulating shift register according to the first embodiment of the present invention;

FIG. 13 is a flow chart for explaining the distance measurement sequence of a camera which adopts the distance measuring apparatus according to the first embodiment of the present invention;

FIGS. 33A to 33F illustrate the method of reliability discrimination according to the first embodiment of the present invention.

DESCRIPTION OF THE PREFERRED EMBODIMENTS

First Embodiment

A distance measuring apparatus according to the first embodiment of the present invention will be explained below with reference to the accompanying drawings.

Figure 1:
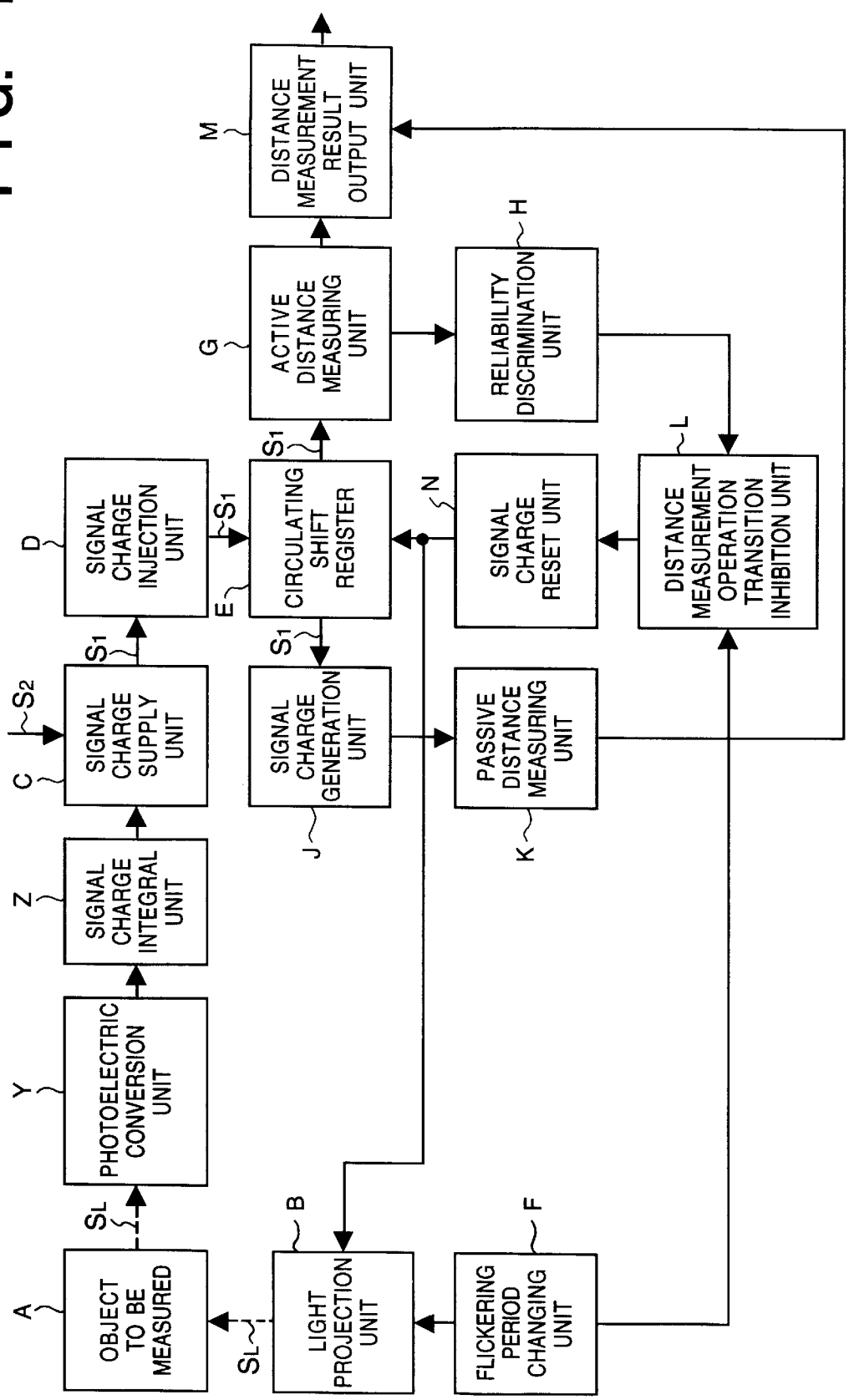
FIG. 1 is a schematic block diagram showing the functional arrangement according to the first embodiment of the present invention.

The outline of this embodiment will be explained with reference to FIGS. 1 and 2.

The schematic arrangement of a distance measuring apparatus according to the present invention will be described below with reference to FIG. 1. Referring to FIG. 1, reference symbol A denotes an object to be measured; B, a light projection unit; C, a signal charge supply unit; D, a signal charge injection unit; E, a circulating shift register; F, a flickering period changing unit; G, an active distance measuring unit; H, a reliability discrimination unit; J, a signal charge generation unit; K, a passive distance measuring unit; L, a distance measurement operation transition inhibition unit; M, a distance measurement result output unit; and N, a signal charge reset unit.

The light projection unit B is driven to flicker and project light beam pulses $S_L$ toward the object A to be measured, the distance to which is to be measured.

A photoelectric conversion unit Y comprises a plurality of photoelectric conversion elements that receive the light beam pulses $S_L$, which are reflected by the object A to be measured and return to the apparatus, and output signal charges $S_1$. A signal charge integral unit Z integrates the signal charges $S_1$, output from the photoelectric conversion unit Y having the plurality of photoelectric conversion elements. The signal charge supply unit C transfers the charge output from the integral unit Z in accordance with predetermined charge transfer pulses $S_2$.

The signal charge injection unit D injects the signal charge $S_1$ transferred by the signal charge supply unit C into the circulating shift register.

The circulating shift register E gradually accumulates the signal charge $S_1$ injected from the signal charge injection unit D.

The flickering period changing unit F changes the flickering period of the light projection unit B in correspondence with the situation of the object A to be measured.

The active distance measuring unit G performs distance measurement calculations on the basis of the signal charge $S_1$ obtained by accumulating the output charges from the plurality of photoelectric conversion elements by driving to flicker the light projection unit B for a predetermined period of time.

The reliability discrimination unit H discriminates the reliability of the distance measurement calculation result of the distance to the object A to be measured with reference to reliability data which is pre-stored on the basis of the similarity between two received light images.

The signal charge reset unit N turns off the light projection unit B and resets the accumulated signal charge $S_1$ when the reliability discrimination unit H determines that the calculation result of the active distance measuring unit G has poor reliability.

The signal charge generation unit J generates a new signal charge $S_1$ on the basis of the luminance signals of an image of the object A to be measured formed on the plurality of photoelectric conversion elements when the accumulated signal charge $S_1$ is reset by the signal charge reset unit N.

The passive distance measuring unit K performs a passive distance measurement operation for calculating the distance to the object A to be measured on the basis of the signal charge $S_1$ generated by the signal charge generation unit J.

The distance measurement operation transition inhibition unit L inhibits the distance measurement operation from transiting to a passive distance measurement operation when the flickering period of the light projection unit B is larger than a predetermined period.

The distance measurement result output unit M outputs the distance measurement results of the active and passive distance measuring units G and K.

According to the distance measuring apparatus with the above-mentioned arrangement, the flickering period of the light projection unit B, which is driven to flicker and project the light beam pulses $S_L$ toward the object A to be measured, can be broadened within the range in which the charge accumulation portions, the circulating shift register E, and the like are not saturated by charges obtained based on external light and signal light, and the timings of signals that operate in synchronism with the flickering period of the light beam pulses $S_L$ can also be changed in association with the flicking period.

Therefore, the above-mentioned problem that distance measurements to the object A to be measured located at a far-distance position are disabled due to loss of some signal charges $S_1$ during the process of injecting signal charges from the signal charge injection unit D into a charge transfer channel, can be solved since the flickering period of the light projection unit B is prolonged and the amount of charges integrated during the period can be increased accordingly.

In this way, the charge moving amount per transfer can be increased, and the influence of standing charges can be relatively suppressed. Hence, the distance to the object A to be measured located at a farther-distance position can be measured.

When a reliable distance measurement calculation result cannot be obtained due to a signal charge $S_1$ of insufficient level accumulated by driving to flicker the light projection unit B for a predetermined period of time in an active distance measurement operation, the distance measurement mode is inhibited from transiting to a passive distance measurement operation. Thus, the release time lags can be prevented from being prolonged due to a nonsensically long distance measurement time in a dark situation in the distance measurement performance in the passive distance measurement mode considerably lowers.

A schematic arrangement as the second feature of the distance measuring apparatus according to the present invention will be described below with reference to FIG. 2. Note that the same reference numerals in FIG. 2 denote the same functions as those in FIG. 1, and a detailed description thereof will be omitted.

Figure 2:
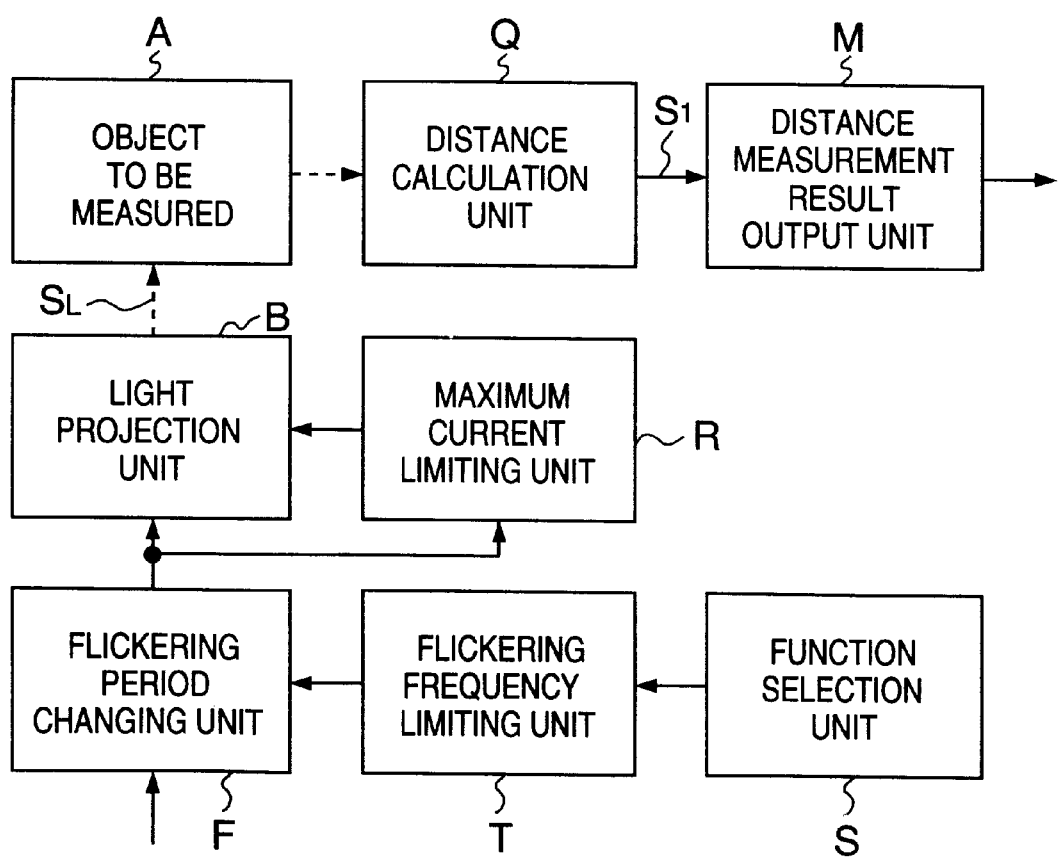
FIG. 2 is a schematic block diagram showing another example of the functional arrangement according to the first embodiment of the present invention.

In FIG. 2, a distance calculation unit Q has a photoelectric conversion element (not shown) that receives light beam pulses $S_L$, which are reflected by the object A to be measured and return to the apparatus, and integrates signal charges $S_1$ output from the photoelectric conversion element to calculate the light-receiving position on the photoelectric conversion element. Then, the unit Q calculates the distance to the object A to be measured on the basis of the calculated light-receiving position.

A maximum current limiting unit R limits the maximum value of the current to be supplied to the light projection unit B in correspondence with the flickering frequency changed by the flickering period changing unit F.

A function setting unit S selects to successively perform distance measurement calculations for the object A to be measured.

A flickering frequency limiting unit T inhibits the flickering frequency that flickers the light beam pulses $S_L$ from being set to be lower than a predetermined value when the function setting unit S selects to successively perform distance measurement calculations.

According to the distance measuring apparatus with the above arrangement, the flickering period of the light projection unit B can be changed in correspondence with the situation of the object A to be measured, and the maximum value of the current to be supplied to the light projection unit B can be limited in correspondence with the flickering frequency.

With this arrangement, since the maximum possible current that can prevent the light projection unit B from deteriorating can be supplied, the distance measurement performance of the distance measuring apparatus can be maximally utilized.

When the operation for always measuring the distance to the object A to be measured by successively repeating the distance measurement operation is selected, the flickering frequency of the light projection unit B is inhibited from being set to be lower than the predetermined value. Even when the light projection unit B may deteriorate due to a temperature rise caused by heat since a current is continuously supplied to the light projection unit B, the temperature rise caused by heat can be suppressed, and the temperature of the light projection unit B can be prevented from rising up to a temperature that causes deterioration.

The distance measuring apparatus according to the present invention will be described in detail below with reference to FIGS. 3 to 15, 32A to 32F, and 33A to 33F.

Figure 3:
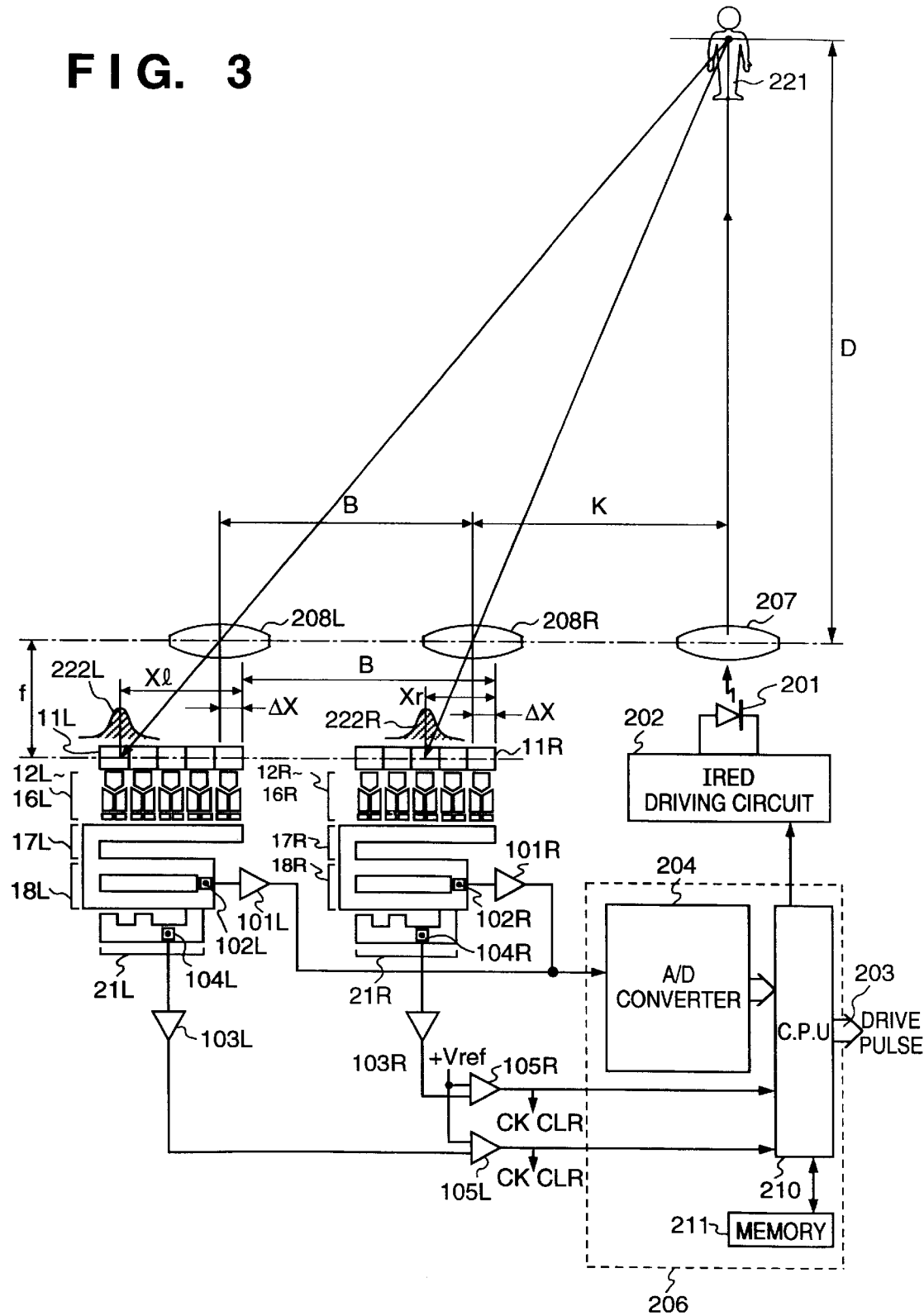
FIG. 3 is a diagram showing a distance measuring apparatus using a circulating shift register according to the first embodiment of the present invention.

FIG. 3 is a diagram showing the feature of the distance measuring apparatus of the present invention, and depicts an example in which the circulating shift register is applied to a distance measuring apparatus of an auto-focus apparatus of a camera. Since a signal of the auto-focus apparatus must cope with various types of objects, i.e., from a near-distance, high-reflectance object to a far-distance low-reflectance object, a very broad dynamic range (normally, about 1:10,000) is required.

Hence, it is difficult to assure a sufficiently broad dynamic range in the signal processing apparatus, and various means are adopted. In the circulating shift register to be described below, if the signal has a sufficiently high level, accumulation/addition is stopped after several accumulations, and if the signal has a low level, the accumulation is repeated several hundreds of times, thus obtaining a signal level high enough to perform distance measurement calculations.

Figure 4:
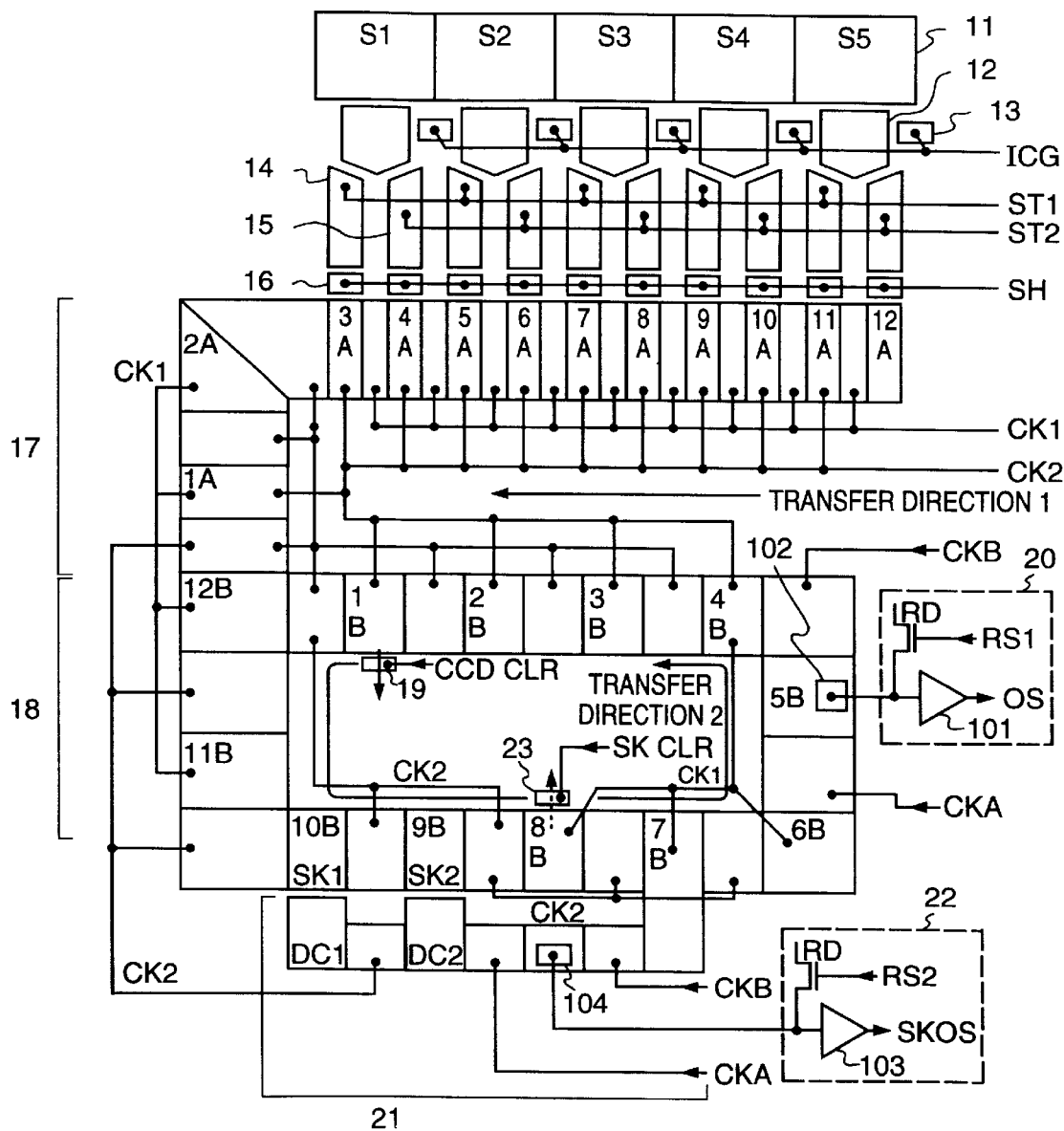
FIG. 4 is a diagram showing an example of the circulating shift register according to the first embodiment of the present invention.

The operation of the circulating shift register portion will be described in detail below with reference to FIG. 4. Referring to FIG. 4, reference numeral 11 denotes a sensor array consisting of a plurality of photoelectric conversion elements each of which serves as a signal charge supply unit that receives light and converts it into a charge. In the following description, assume that the sensor array 11 is constituted by five pixels, i.e., first to fifth pixel sensors S1 to S5.

Reference numeral 12 denotes integral portions for integrating charges photoelectrically converted by the pixel sensors S1 to S5 of the sensor array 11.

Reference numeral 13 denotes clear portions which are arranged in correspondence with the integral portions 12, and clear charges integrated by the integral portions (to the clear state).

Reference numeral 14 denotes first accumulation portions; and 15, second accumulation portions. The first accumulation portions 14 receive charges from the integral portions 12 in response to pulses ST (storage) 1, and the second accumulation portions 15 receive charges from the integral portions 12 in response to pulses ST2.

Figure 6:
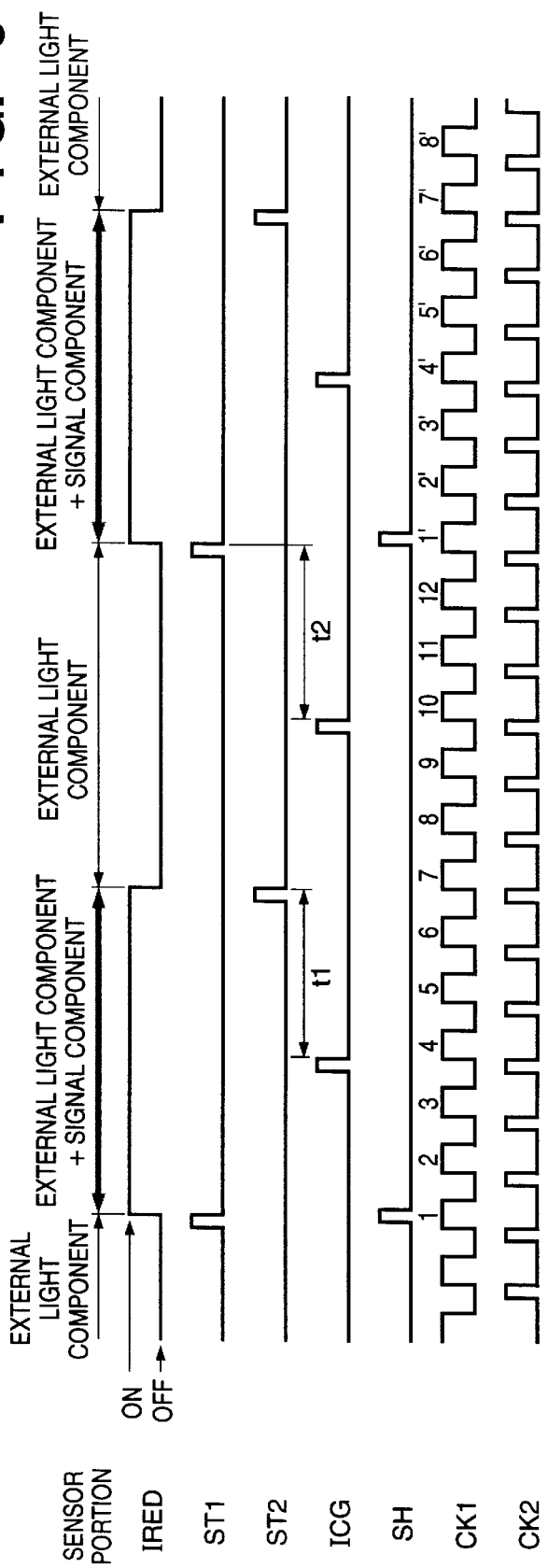
FIG. 6 is a timing chart for explaining the operation sequence of the circulating shift register according to the first embodiment of the present invention.

Reference numeral 16 denotes shift portions which move all the charges in the first and second accumulation portions 14 and 15 to a linear CCD 17 that serves as a signal charge injection unit upon application of a sampling/hold pulse SH at the timing shown in the timing chart in FIG. 6.

Transfer clock pulses CK1 and CK2 are alternately applied to the linear CCD 17, and charges moved from the first and second accumulation portions 14 and 15 are transferred in a first transfer direction 1 in response to these transfer clock pulses CK1 and CK2.

A ring CCD 18 serving as a circulating shift register that connects a plurality of charge transfer channels in a loop pattern is connected to the end, in the first transfer direction 1 side, of the linear CCD 17. The transfer clocks pulses CK1 and CK2 are also alternately applied to the ring CCD 18, and charges present in the respective charge transfer channels circulate the ring CCD 18 while being transferred in a second transfer direction 2.

Charges present in the respective charge transfer channels of the linear CCD 17 are transferred in the first transfer direction 1 in response to the transfer clock pulses CK1 and CK2. A charge present in a first charge transfer channel 1A is transferred to the neighboring charge transfer channel in response to the transfer clock pulse CK2.

Furthermore, the charge is transferred to a 12th charge transfer channel 12B of the ring CCD 18 in response to the next transfer clock pulse CK1. In this case, since a charge originally present in a charge transfer channel 1B of the ring CCD 18 is also transferred to the 12th charge transfer channel 12B at that time, the charges are added to each other in the 12th charge transfer channel 12B.

In this embodiment, the number of charge transfer channels of the linear CCD 17 is set to be equal to the number of charge transfer channels of the ring CCD 18, so that charges in the first charge transfer channels 1A and 1B, second charge transfer channels 2A and 2B, third charge transfer channels 3A and 3B, . . . , 12th charge transfer channels 12A and 12B are always added to each other.

Note that the first and second charge transfer channels 1A and 2A do not receive any signal charges from the sensor array, and, hence, they serve as non-signal charge portions in which only charges of noise components such as a dark current are accumulated.

Reference numeral 19 denotes a CCD clear portion. When a signal CCDCLR is applied to this CCD clear portion 19, a charge in the first charge transfer channel 1B is cleared. More specifically, in the initialization mode shown in the timing chart in FIG. 7, when the signal CCDCLR is applied to the CCD clear portion 19, and the transfer clock pulses CK1 and CK2 are applied until charges circulate the ring CCD 18 once, since charges originally present in the ring CCD 18 must pass the first charge transfer channel 1B, each charge is cleared there, and all the charges in the ring CCD can be consequently cleared (reset state).

Reference numeral 20 denotes an output portion for converting a charge amount present in a fifth charge transfer channel 5B into a voltage via a floating electrode portion 102 formed on the fifth charge transfer channel 5B, and outputting the voltage to an external apparatus. The output portion 20 outputs a signal OS at the timing shown in the timing chart in FIG. 8.

Figure 8:
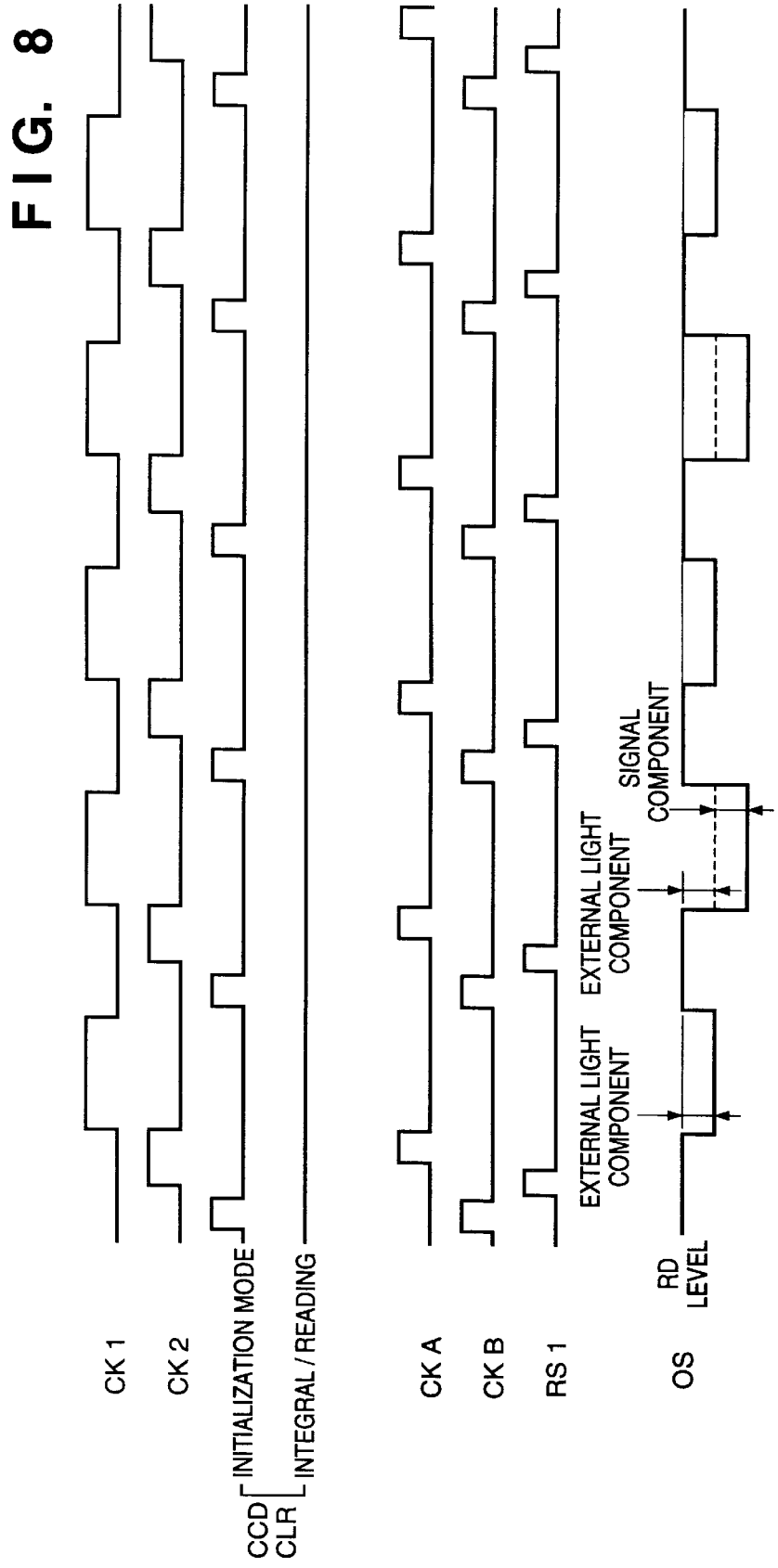
FIG. 8 is a timing chart for explaining the operation sequence of the circulating shift register according to the first embodiment of the present invention.

Note that reference symbol RD in the output portion 20 denotes a reset potential. When a reset pulse RS1 is applied to the output portion 20, as shown in FIG. 8, the floating electrode portion 102 is reset to the reset potential RD.

Figure 5:
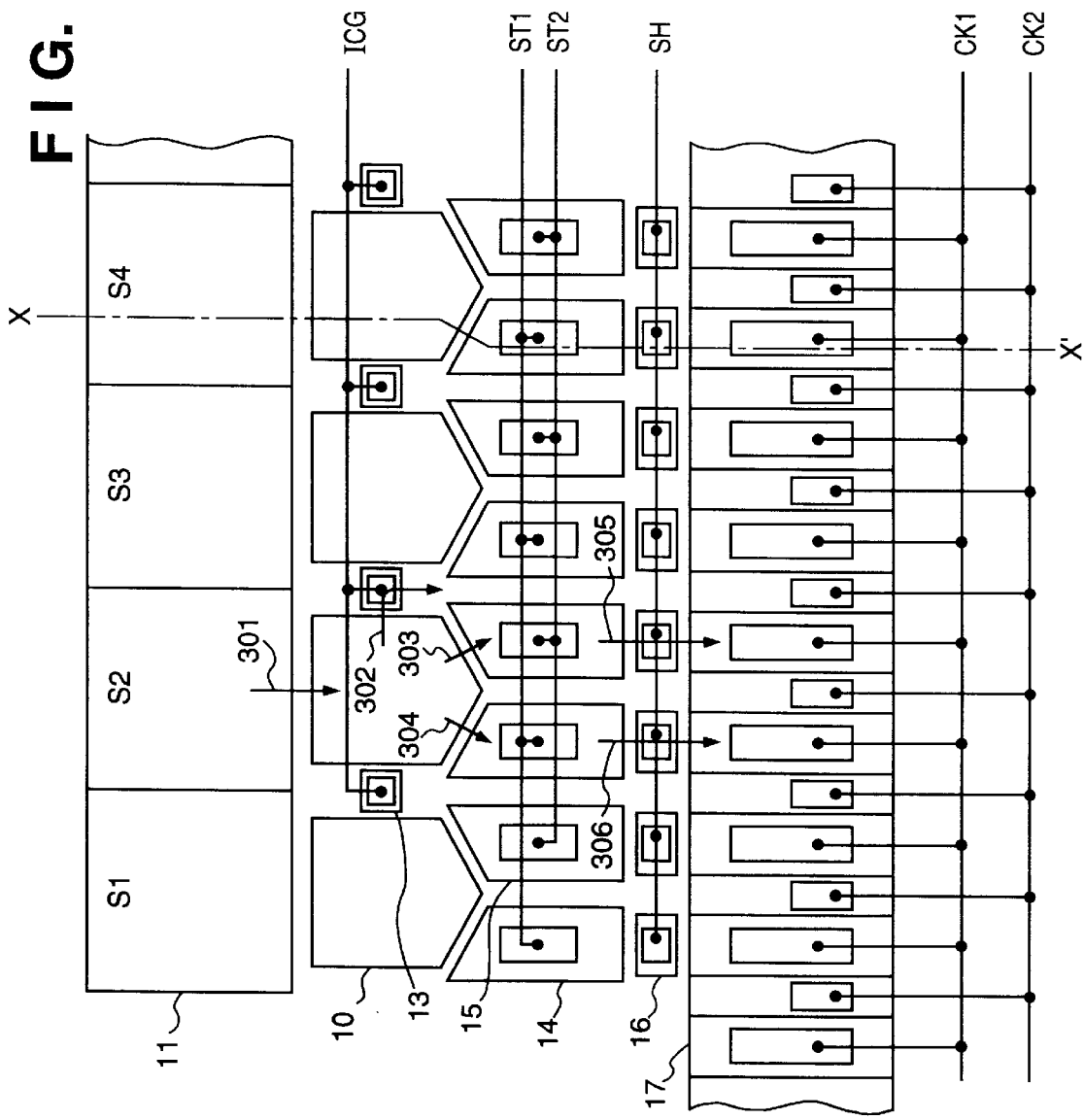
FIG. 5 is a diagram for explaining the flow of charges from a sensor array according to the first embodiment of the present invention.

FIG. 5 is an enlarged view of the circulating shift register portion shown in FIG. 4 from the photoelectric conversion elements to the linear CCD 17, and is a view for explaining the charge flow. FIGS. 10A to 11B are sectional views taken along a line X–X' in FIG. 5, and are views for explaining the charge transfer state.

Figure 10A:
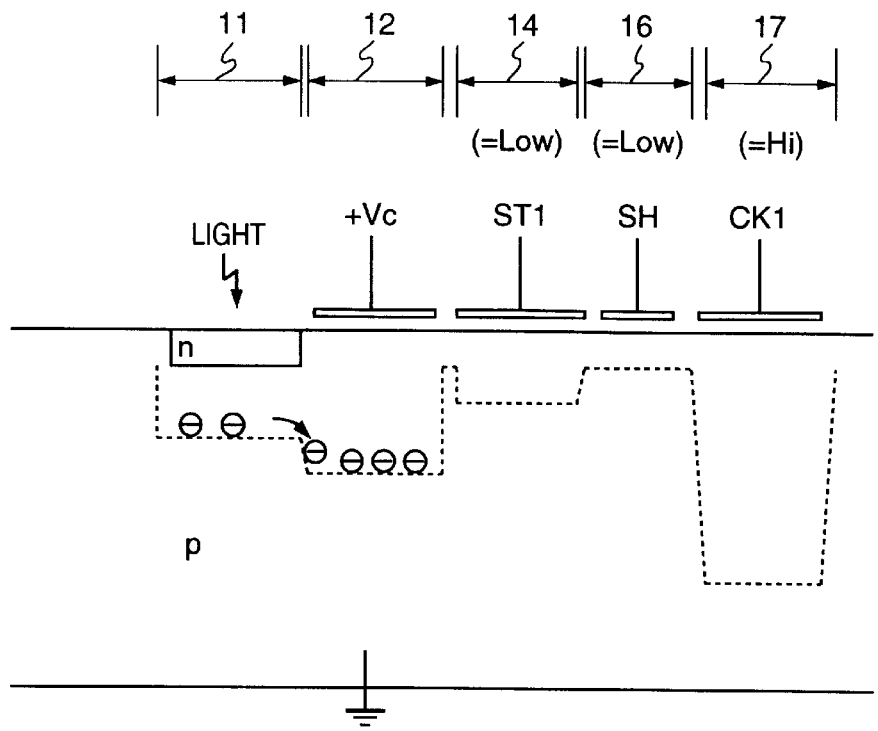
FIGS. 10A and 10B are sectional views showing the charge transfer process in a charge transfer unit according to the first embodiment of the present invention.

FIG. 10A shows a situation in which charges generated based on light irradiated onto the sensor array 11 are collected to each integral portion 12.

As shown in FIG. 10A, a constant positive voltage +Vc is applied to an electrode of the integral portion 12, and charges are collected in a potential formed beneath the electrode.

Figure 10B:
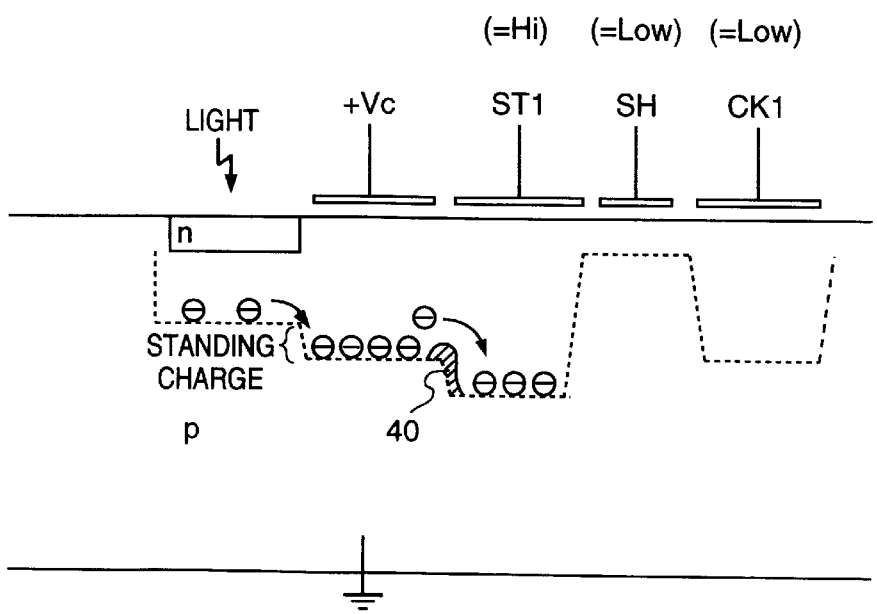

FIG. 10B shows the state wherein a pulse ST1 is applied to the first accumulation portion 14, and charges present in the integral portion 12 move to the first accumulation portion 14. Note that reference numeral 40 denotes a so-called barrier, which should not be present ideally.

However, the barrier 40 portion is produced as a result of disturbance to the potential formed due to misalignment of a mask for the manufacture of an apparatus in the manufacturing process. The barrier 40 intercepts some of charges that move to the first accumulation portion 14. The intercepted charge amount is nearly constant, and such charges will be referred to as standing charges γ hereinafter.

Figure 11A:
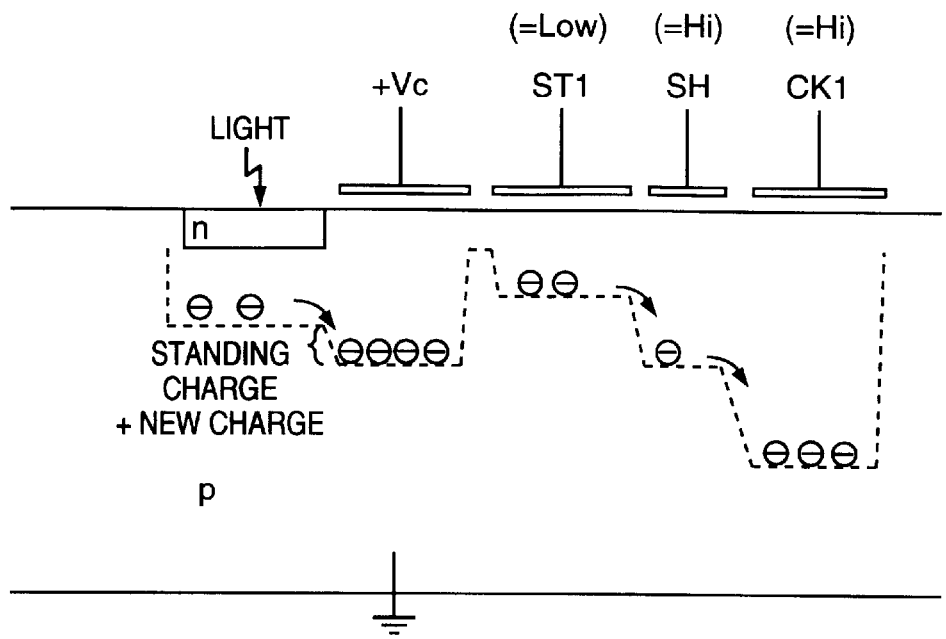
FIGS. 11A and 11B are sectional views showing the charge transfer process in the charge transfer unit according to the first embodiment of the present invention.

FIG. 11A shows the state wherein charges move from the first accumulation portion 14 to the linear CCD 17 via the shift portion 16. At this time, new charges also flow from the sensor array 11 to the integral portion.

Figure 11B:
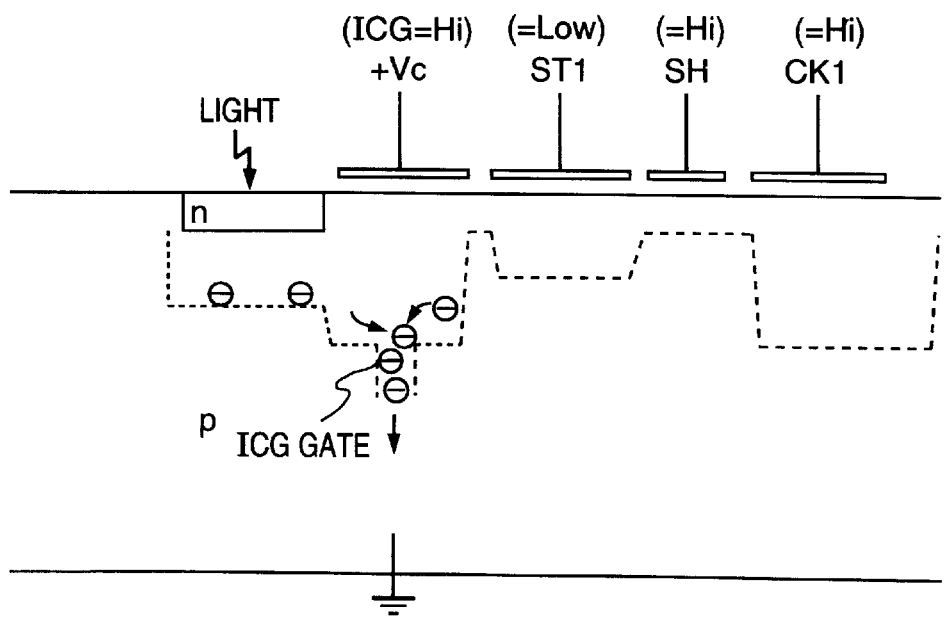

FIG. 11B shows the state wherein a pulse ICG is applied to the clear portion 13 in FIG. 4, and all the charges present in the integral portion 12 are removed. Owing to the above-mentioned mechanism, some of signal charges produced in the photoelectric conversion element may be lost while they are injected from the signal charge injection unit to the charge transfer channel via the signal charge supply unit.

If β represents charges produced by signal light irradiated onto the sensor array 11, the amount of charges transferred to the first accumulation portion 14 is (β−γ). In this case, if signal light is very weak, signal charges β produced there become smaller in amount than the above-mentioned standing charges γ, and (β−γ)<0 may hold.

In such case, all the signal charges β are intercepted by the integral portion 12, and none of them are transferred to the first accumulation portion 14. Therefore, no signal charges are transferred to the linear CCD 17, and as a consequence, no charges are transferred to the circulating shift register connected to the linear CCD. Therefore, no signal can be obtained from the output portion 102.

That is, in the distance measuring apparatus of the autofocus apparatus for the camera, when the object to be measured is located at a far-distance position, the amount of light irradiated onto the photoelectric conversion element is small, and as a consequence, a small number of charges are produced. In such case, most of these charges are intercepted by the barrier 40, and it becomes impossible to perform distance measurements.

Also, when the object to be measured is located at a far-distance position and the environment is too dark to allow passive distance measurements, a hybrid type distance measuring apparatus drives to flicker the light projection unit so as to perform an active distance measurement operation. However, since the object to be measured is located at a far-distance position, light beam pulses emitted by the light projection unit and reflected by the object to be measured are very weak, and a reliable distance measurement calculation result to the object to be measured cannot be obtained.

Accordingly, the active operation is ended, and the passive operation is started. However, since the environment is too dark, no reliable distance measurement calculation result is obtained even in the passive distance measurements, and consequently, a lens is driven to a predetermined focal length position.

In this way, when the object to be measured is located at a far-distance position and the environment is too dark to allow passive distance measurements, the time required for the distance measurement operation and distance measurement calculations becomes longest, and the shutter timing is delayed accordingly. That is, the camera is not easy to use due to too large time lags.

In view of such problems, this embodiment comprises the mechanism to be described below. More specifically, in FIG. 3, an AF control circuit 206 controls to flicker an IRED 201 via an IRED driving circuit 202.

Light emitted by driving to flicker the IRED 201 is irradiated onto an object 221 via a projection lens 207. The light is reflected by the object 221, and is incident on sensor arrays 11R and 11L via light-receiving lenses 208R and 208L.

With this control, received-light images 222R and 222L formed on the sensor arrays 11R and 11L also flicker. That is, when the IRED 201 is ON, the received-light images 222R and 222L appear on the sensor arrays 11R and 11L, and these image signals and external light components are converted into charges by photoelectric conversion elements.

On the other hand, when the IRED 201 is OFF, only external light is irradiated onto the sensor arrays 11R and 11L, and is converted into charges by the photoelectric conversion elements. Note that the AF control circuit 206 has a function of generating drive pulses 203 for driving the sensor arrays 11R and 11L, signal integral portions 12R to 16R and 12L to 16L, linear CCDs 17R and 17L, and ring CCDs 18R and 18L arranged as circulating shift registers, and controlling their operations.

Referring to FIG. 5, a signal charge photoelectrically converted by the sensor S2 as one pixel of the sensor array 11 is supplied to the integral portion 12 along a route indicated by an arrow 301, and is integrated (see FIG. 10A). By applying a pulse ICG to a line ICG connected to the clear portion 13 at the timing shown in FIG. 6, the signal charge present in the integral portion 12 is removed along a route indicated by an arrow 302 (see FIG. 11B).

In other words, the charge in the integral portion 12 is cleared. Accordingly, by controlling the pulse ICG, a so-called electronic shutter function of arbitrarily varying the time required for accumulating the charge in the integral portion 12 can be obtained.

Time periods t1 and t2 between the pulses ICG, and ST1 and ST2 shown in FIG. 6 correspond to the integral time. Each integral portion comprises neighboring first and second accumulation portions 14 and 15, and a charge flows from the integral portion 12 into the first accumulation portion via a route indicated by an arrow 304 in response to the pulse ST1 at the timing shown in FIG. 6 (see FIG. 10B).

On the other hand, a charge flows from the integral portion 12 into the second accumulation portion via a route indicated by an arrow 303 in response to the pulse ST2. As shown in FIG. 4, the first and second accumulation portions 14 and 15 are alternately juxtaposed, and the shift portions 16 are arranged therebelow.

When a shift pulse is applied to each shift portion 16, a charge accumulated in the corresponding first accumulation portion 14 is transferred to the charge transfer channel of the linear CCD 17 shown in FIG. 5 via a route indicated by an arrow 306 (see FIG. 11B).

Also, a charge accumulated in the second accumulation portion 15 is transferred to the charge transfer channel of the linear CCD 17 via a route indicated by an arrow 305.

At this time, since the AF control circuit 206 operates to output the pulses ST1 in synchronism with the OFF states of the IRED 201, as shown in FIG. 6, each first accumulation portion 14 accumulates a charge corresponding to only external light components irradiated onto the sensor.

On the other hand, since the AF control circuit 206 operates to output the pulses ST2 in synchronism with the ON states of the IRED 201, each second accumulation portion 15 accumulates a charge corresponding to the sum of signal components reflected by the object and external light components. In response to a sample-hold pulse SH, the charges accumulated in the first and second accumulation portions 14 and 15 are transferred to the charge transfer channels 3A to 12A shown in FIG. 4.

In this way, the charges corresponding to only external light components are transferred to the charge transfer channels 3A, 5A, 7A, 9A, and 11A, and the charges corresponding to the sums of signal components reflected by the object and external light components are transferred to the charge transfer channels 4A, 6A, 8A, 10A, and 12A.

Note that the sample-hold pulse SH is generated in synchronism with the round of the ring CCD 18. Furthermore, since the ON and OFF periods of the IRED and the pulses ST1 and ST2 are synchronized with the sample-hold pulse SH, signal charges obtained by integrating charges from an identical sensor are added in each charge transfer channel of the ring CCD 18.

Figure 7:
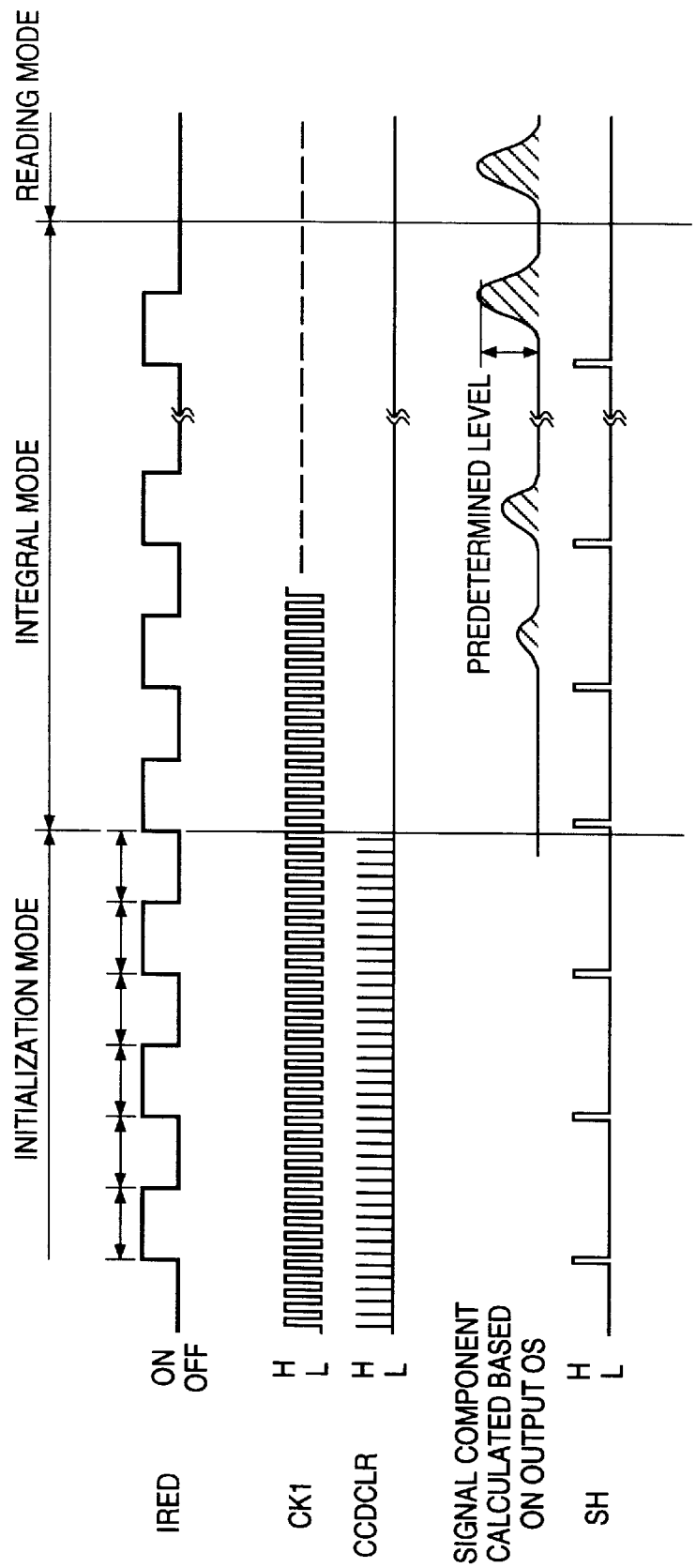
FIG. 7 is a timing chart for explaining the operation sequence of the circulating shift register according to the first embodiment of the present invention.

The distance measuring apparatus shown in FIG. 3 outputs the pulse ICG in the initialization mode shown in FIG. 7 at the timing given by:

$$t1=t2=0$$

That is, by setting t1=t2=0, the charges in the integral portions 12 are cleared.

When the pulse CCDCLR are applied over a period in which charges circulate the ring CCD 18 three rounds or more, all the charges remaining in the first and second accumulation portions 14 and 15, the linear CCD 17, and the ring CCD 18 are reset via the CCD clear portion 19 shown in FIG. 4. After the charges in the respective portions are completely cleared, the pulses CCDCLR is stopped to start the integral mode, as shown in FIG. 7.

In this case, generation of the pulses ICG, ST1, ST2, SH, CK1, and CK2 and the operation of the IRED are controlled at the predetermined timings shown in FIG. 6 under the condition:

$$t1=t2>0$$

The charges corresponding to external light components during the OFF period of the IRED are transferred to the charge transfer channels 3A, 5A, 7A, 9A, and 11A of the linear CCD 17 via the first accumulation portions 14, and are added and accumulated in turn in the ring CCD 18. Similarly, the charges corresponding to the sums of signal components reflected by the object and external light components during the ON period of the IRED are transferred to the charge transfer channels 4A, 6A, 8A, 10A, and 12A of the linear CCD 17 via the second accumulation portions 15, and are added and accumulated in turn in the ring CCD 18.

The signals OS as the output signals from the output portion 20 are A/D-converted by an A/D converter 204 via a corresponding one of amplifiers 101R and 101L, and digital data is supplied to the AF control circuit 206. The signals OS are output as follows:

level of non-signal portion level of non-signal portion external light components irradiated onto S1 external light components+signal components irradiated onto S1 external light components irradiated onto S2 external light components+signal components irradiated onto S2 external light components irradiated onto S5 external light components+signal components irradiated onto S5

The AF control circuit 206 calculates the difference between the charge amounts continuously output from the identical sensor. When the charge amount of signal components reflected by the object to be measured has reached a predetermined level high enough to perform distance measurement calculations, the AF control circuit 206 starts the reading mode shown in FIG. 7 and stops the sample-hold pulses SH to end additions of the signal charges.

Thereafter, the charges are further transferred inside the CCD, and the outputs OS are A/D-converted by the A/D converter 204 of the AF control circuit 206. Then, a CPU 210 performs the following calculations and writes only the charge amounts of signal components in a memory 211.

level of non-signal portion−level of non-signal portion=0

(external light components+signal components irradiated onto S1)−(external light components irradiated onto S1)=(signal components irradiated onto S1)

(external light components+signal components irradiated onto S2)−(external light components irradiated onto S2)=(signal components irradiated onto S2)

(external light components+signal components irradiated onto S5)−(external light components irradiated onto S5)=(signal components irradiated onto S5)

As a result of executing the above-mentioned processing for the two ring CCDs 18R and 18L shown in FIG. 3, the positions, Xr and Xl, of the received-light images 222R and 222L can be obtained. Based on these positions Xr and Xl, the distance, D, to the object can be calculated. Note that the projection lens 207 and the light-receiving lenses 208R and 208L are present along an identical straight line, the two light-receiving lenses are separated by a distance B, the light-receiving lens 208R and the projection lens 207 are separated by a distance K, and the object 221 is separated by the distance D in the vertical direction from the projection lens 207.

Also, the sensor arrays 11R and 11L are separated by the distance B, and are arranged to be separated by a distance f from the light-receiving lenses 208R and 208L. Let Xr be the distance from one end of the sensor array 11R to the received-light image 222R, ΔX be the distance from one end of the sensor array 11R to a point on a perpendicular dropped from the principal point of the light-receiving lens 208R, Xl be the distance from one end of the sensor array 11L to the received-light image 222R, and ΔX be the distance from one end of the sensor array 11L to a point on a perpendicular dropped from the principal point of the light-receiving lens 208L.

Then, the following equations hold:

$$D/K=f/(Xr-\Delta X) \quad (1)$$

$$D/(B+K)=f/(Xl-\Delta X) \quad (2)$$

By eliminating K from these equations (1) and (2) and solving them for D, we have:

$$D=B\times f/(Xl-Xr) \quad (3)$$

More specifically, since B and f are constant and are known values, the distance D to the object 221 can be calculated by substituting the positions Xr and Xl of the received-light images on the sensor arrays into equation (3).

Referring back to FIG. 4, the skim portion 21 performs "so-called skimming for removing equal amounts of DC signal components (assumed to be external light components) from a pair of signal components from a photoelectric conversion element during the ON period of the light projection unit, and signal components from the photoelectric conversion element during the OFF period in the CCD".

Referring to FIG. 4, charge transfer channels SK1 and SK2 are formed with internal potentials to leave a predetermined amount of charges. Accordingly, overflowing charge components, which have exceeded a predetermined charge amount of the charge transfer channel SK1, of those transferred from the 11th charge transfer channel 11B flow into a channel DC1.

After the charge components from the 11th charge transfer channel 11B are distributed to the first charge transfer channel SK1 and the channel DC1, they are respectively transferred to the second charge transfer channel SK2 and a channel DC2 in response to the transfer clock pulse CK2.

The second charge transfer channel SK2 is formed with the internal potential to leave a predetermined amount of charge components smaller than that in the first charge transfer channel SK1, and overflowing charge components flow into the channel DC2 to be added here to the charge components transferred from the channel DC1.

Reference numeral 22 denotes an SK output portion, which resets the floating gate 104 to the level RD upon application of a reset signal RS2. When the charge components are transferred from the channel DC2 to the SK output portion 22, the output SKOS appears from the floating gate via an amplifier 103 in correspondence with the transferred charge amount.

In FIG. 3, reference numerals 21R and 21L denote portions that perform skimming. The portions 21R and 21L respectively connect the potentials of floating gate portions 104R and 104L to skim comparators 105R and 105L via amplifiers 103R and 103L.

The outputs SKOS are compared with a reference voltage +Vref by the comparators 105R and 105L in FIG. 3 at the OFF timing of the IRED. Upon detecting the output SKOS that exceeds the reference voltage, it is determined that "many charges are present in the charge transfer channels, and may saturate the charge transfer channels". Then, pulses SKCLR are output with respect to the charge of interest and the next charge to be transferred at the timings shown in FIG. 9.

In FIG. 4, reference numeral 23 denotes a skim clear portion. Upon application of the pulses SKCLR, the skim clear portion 23 flows the charge components (the amount of which corresponds to the predetermined amount in the second charge transfer channel SK2 and is represented by α) present in the eighth charge transfer channel 8B to a ground line (not shown) to clear the charge transfer channel 8B.

Since the pulses SKCLR are also input to the CPU 210, the CPU 210 can detect the clear timing. When no pulses SKCLR are output, the charge present in the eighth charge transfer channel 8B is transferred to the seventh charge transfer channel 7B and is added to the charge transferred from the floating electrode portion 104.

When the above-mentioned comparator detects the output SKOS based on the charge corresponding to external light components equal to or higher than the reference voltage, an equal charge amount α is skimmed from both the charge that corresponds to external light components and the charge that corresponds to the sum of signal components reflected by the object and external light components, and that are irradiated onto an identical sensor.

As has already been described above, the following calculation:

(external light components+signal components irradiated onto S1-α)-(external light components irradiated onto S1-α)

yields (signal components irradiated onto S1, and has no influence on the charge amount of target signal components.

Therefore, even when the object to be measured is present under the condition of strong external light, the charge transfer channels can be prevented from being saturated by the charges corresponding to external light components by repetitively executing skimming, and the charges corresponding to signal components reflected by the object can be accumulated up to a level high enough to perform distance measurement calculations.

Upon executing distance measurements by the distance measuring apparatus of the auto-focus apparatus of the camera with the above-mentioned arrangement, the charges inside the ring CCD 18 and the linear CCD 17 are cleared (reset state) in the initialization mode shown in FIG. 6.

Subsequently, the integral mode is started and the IRED is driven to flicker at an allowable lowest frequency. In this state, the pulses ICG are output at timings to maximize the times t1 and t2, and accumulation of signal charges is started at the same time. When the driving frequency of the IRED is low, the charge accumulation time per emission is prolonged, and the amount of charges accumulated increases, thus relatively suppressing the influence of standing charges on loss of signal charges.

When a distance measurement is performed in a bright environment, the inversion timings of the skim comparators 105R and 105L become earlier due to many external light components, and skimming may be performed for charges accumulated during the first flickering period depending on the brightness of the object to be measured.

In such case, the driving frequency of the IRED is appropriately set to shorten the charge accumulation time per emission of the sensor array 11 and to prevent the transfer channels of the ring CCD 18 from being saturated by charges accumulated by the single accumulation.

Since the driving frequency of the IRED is synchronized with the charge transfer rate, it cannot be increased unconditionally. The upper limit of the transfer clock frequency of the ring CCD 18 is about 500 kHz, and when the frequency exceeds this upper limit, the transfer efficiency lowers considerably, resulting in an adverse influence on distance measurements.

Accordingly, when the driving frequency of the IRED has reached its upper limit, the output timings of the pulses ICG are changed to shorten the times t1 and t2 so as to optimize the charge accumulation time per emission. In a bright environment, since the amount of charges corresponding to external light components is large, signal charge components lost due to the presence of standing charges correspond to some of charges corresponding to external light, and have no influence on charges corresponding to the signal components.

In the distance measuring apparatus of this embodiment, the sensor array consisting of a plurality of photoelectric conversion elements obtains a signal charge from the luminance signal of an image of the object to be measured formed on the sensor array, and the distance to the object to be measured can be calculated based on the signal charge.

Referring to FIG. 3, when signal charges are accumulated while inhibiting the ON operation of the IRED 201 as the light projection unit and skimming, the outputs OS obtained are as follows:

level of non-signal portion
level of non-signal portion
external light components irradiated onto S1 external light components irradiated onto S1
external light components irradiated onto S2
external light components irradiated onto S2
external light components irradiated onto S5
external light components irradiated onto S5

When the maximum values of these signals have reached appropriate level for correlation calculations without saturating the charge transfer channels, accumulation of new charges is stopped, and every other signals OS are stored in the memory 211, thus obtaining the charge amount based on the luminance of an image formed on the sensors.

When the above-mentioned processing is performed for the charge outputs of the sensor arrays 11R and 11L shown in FIG. 3, image signals of the object to be measured formed on the sensor arrays can be obtained, and correlation calculation processing for calculating the relative positional relationship between these image signals is executed to obtain the distance to the object to be measured.

This embodiment executes so-called active distance measurements by projecting light beam pulses by driving to flicker the light projection unit for the above-mentioned predetermined period, and performing distance measurement calculations on the basis of the signal charge obtained by accumulating output charges from a plurality of photoelectric conversion elements that receive the light beam pulses reflected by the object to be measured.

The CPU 210 as the reliability discrimination unit discriminates the distance measurement result, and when it determines "no reliability", the distance measurement mode transits to the passive distance measurement mode. Such transition is effective since light beam pulses reflected by the object are very weak and it is hard to obtain a reliable active distance measurement result when the distance to a far-distance object is to be measured in a bright situation, but it often becomes possible to perform distance measurements in the passive distance measurement mode. However, in a dark situation, in the passive distance measurement mode, the luminance of the object to be measured lowers, and a signal charge of sufficient level cannot be obtained, thus considerably lowering the distance measurement performance.

In the distance measuring apparatus of this embodiment, the intensity of external light irradiated onto the sensor array can be detected on the basis of the flickering period of the IRED in the active distance measurement mode. Hence, even when the active distance measurement mode cannot obtain a reliable distance measurement result, if the flickering period of the IRED at that time is longer than that in the active distance measurement mode corresponding to the luminance at which the distance measurement performance lowers in the passive distance measurement mode, transition to the passive distance measurement mode is inhibited, and a predetermined distance is output as the distance measurement result.

As described above, in the active distance measurement method, the maximum possible current is often supplied to the IRED as the light projection unit so as to broaden the distance measurement range in the far-distance direction. However, when the flickering period of the IRED is prolonged, heat generated by the current flowing the IRED intermittently exceeds an allowable value, and deterioration progresses gradually.

Figure 12A:
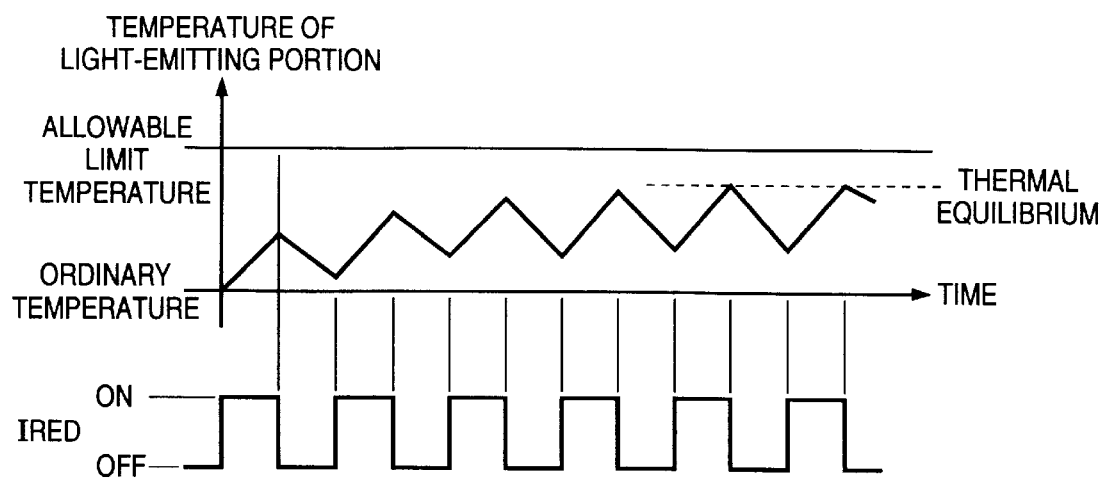
FIGS. 12A and 12B are views for explaining the thermal history of a light-emitting portion in a light projection unit according to the first embodiment of the present invention.
Figure 12B:
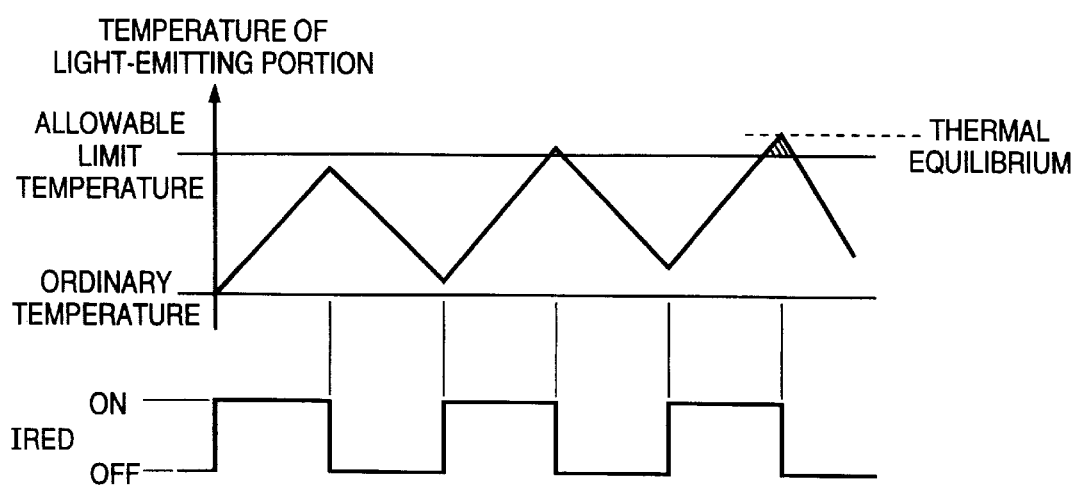

FIGS. 12A and 12B show the relationship between the flickering period of the IRED and heat generation. In FIG. 12A, the temperature of the light-emitting portion rises in the ON state of the IRED and falls in the OFF state. When such processes are repeated, the temperature of the light-emitting portion reaches a thermal equilibrium state soon, and the maximum value of the temperature is stabilized. At this time, since the ON time per flickering period is short, the peak of the amount of heat is small, and the temperature of the light-emitting portion never reaches the allowable limit temperature. In this case, there is no fear of thermal deterioration.

In contrast to this, in FIG. 12B, the same current as in FIG. 12A is supplied to the IRED while doubling the period. In this case, since the ON time per flickering period is prolonged, the maximum value of the temperature of the light-emitting portion becomes large, as shown in FIG. 12B, and when the temperature has reached the thermal equilibrium state, the temperature of the light-emitting portion intermittently has exceeded the allowable light temperature, and this results in progress of deterioration of the IRED.

Accordingly, unconditional prolonging of the flickering period of the IRED must be avoided since it results in deterioration, and the objective of suppressing the influence of some lost charge components cannot be sufficiently coped with.

In order to solve such problem, the distance measuring apparatus of this embodiment takes the following measure.

Figure 14:
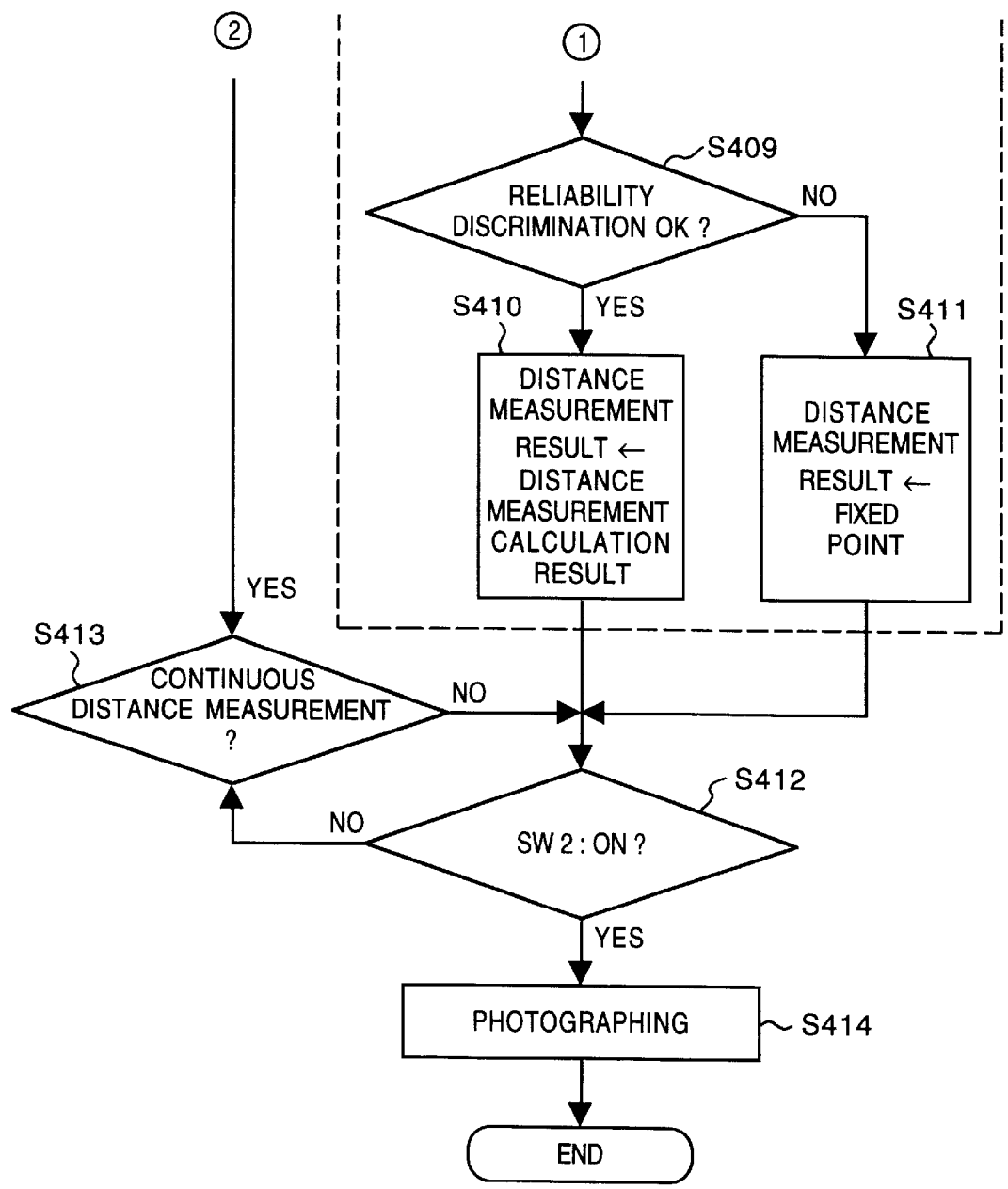
FIG. 14 is a flow chart for explaining the distance measurement sequence of the camera which adopts the distance measuring apparatus according to the first embodiment of the present invention.

That is, the sequence of the camera having a single distance measurement mode and a continuous distance measurement mode will be described below with reference to FIGS. 13 to 15.

S401: When a release button (not shown) is pressed to its first-stroke position, the first switch changes from OFF to ON, and a distance measuring operation is started.

S402: The charges in the ring CCDs 18R and 18L and the linear CCDs 17R and 17L (FIG. 3) are cleared (reset state).

S403: The integral mode is started, and the state of a distance measurement mode changing unit (not shown) is detected. In the single distance measurement mode, the obtained distance measurement result is held, and photographing is performed using the held distance measurement result. When the single distance measurement mode is selected, the flow advances to step S404.

In the case of the continuous distance measurement mode, distance measurements for the object to be measured are repeated until the shutter rand pe timing, and photographing is made based on distance measurement information immediately before the shutter release timing. This mode is also called a sport mode or servo mode, and when this mode is selected, the flow advances to step S405.

S404: Pulses ICG are output at the timings at which the times t1 and t2 are maximized. Also, the driving frequency of the IRED is set to be the lowest possible value, and the IRED current value is set to be the maximum possible value at the selected frequency.

When the driving frequency of the IRED is low, the charge accumulation time per emission is prolonged, and the amount of charges accumulated increases, thus relatively suppressing the influence of loss of signal charges due to standing charges.

S405: Pulses ICG are output at the timings at which the times t1 and t2 are maximized. Also, the driving frequency of the IRED is set to be a frequency twice the lowest possible value, and the IRED current value is set to be the maximum possible value at the selected frequency. In the continuous distance measurement mode, since distance measurements are repeated by repetitively supplying a current to the IRED, heat generated by the light-emitting portion of the IRED becomes large.

Accordingly, when the low driving frequency of the IRED is set in the continuous distance measurement mode, the peak temperature of heat generated by the light-emitting portion becomes higher than that in the single distance measurement mode. For this reason, if the driving frequency of the IRED is set to be nearly its lower limit value, the IRED may deteriorate.

Hence, in the continuous distance measurement mode, the driving frequency of the IRED is inhibited from being lowered to the limit value. In this embodiment, the frequency twice the lower limit driving frequency of the IRED in the single distance measurement mode is set to be the lower limit of the IRED driving frequency in the continuous distance measurement mode.

S406: In order to obtain an optimal charge accumulation amount per emission, the accumulation time is optimized. More specifically, when a distance measurement is performed in a bright environment, the inversion timings of the skim comparators 105R and 105L in FIG. 3 become earlier since the amount of external light is large, and charges accumulated during the first flickering period may require skimming depending on the brightness of the object to be measured.

Figure 15:
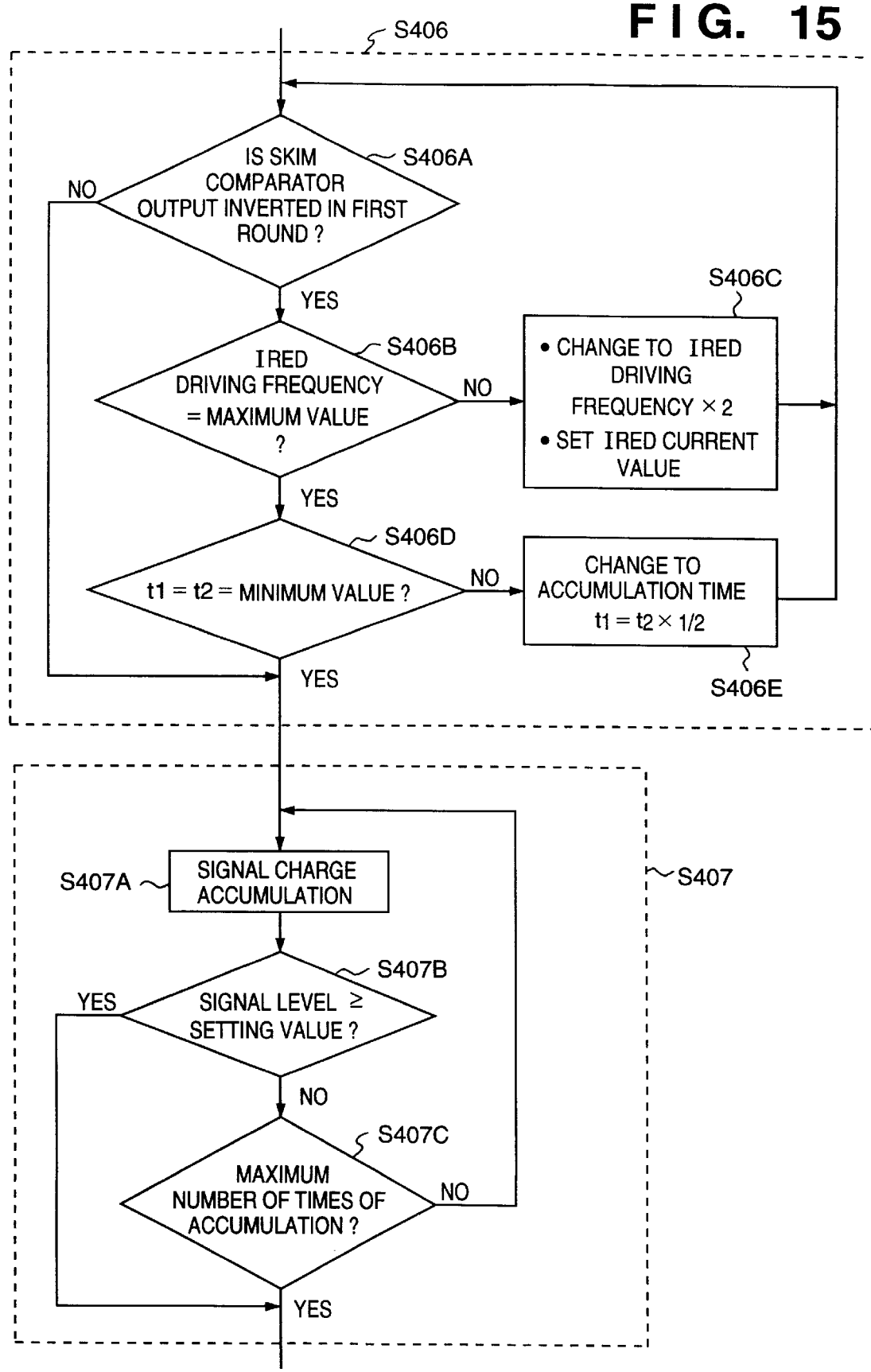
FIG. 15 is a flow chart for explaining the distance measurement sequence of the camera which adopts the distance measuring apparatus according to the first embodiment of the present invention.

In such case, since the circulating shift register may be saturated by charges, the accumulation time is optimized in step S406A and the subsequent steps, as shown in detail in FIG. 15. In a bright environment, since the amount of charges corresponding to external light components is large, signal charge components lost due to the presence of standing charges correspond to some of charges corresponding to external light, and have no influence on charges corresponding to the signal components.

S406B: The charge accumulation amount per emission may be decreased by raising the driving frequency of the IRED. However, the driving frequency of the IRED cannot be unconditionally raised since it is synchronized with the charge transfer rate. The upper-limit transfer clock frequency of the ring CCD 18 is about 500 kHz, and if the clock frequency exceeds the upper limit, the transfer efficiency considerably lowers, resulting in an adverse influence on distance measurements. Therefore, when the driving frequency of the IRED has reached its upper limit, the frequency is fixed at that time, and the flow advances to step S406D.

S406C: The charge accumulation amount per emission is decreased by raising the driving frequency of the IRED. In this step, the driving frequency is multiplied with 2, but this factor may be appropriately determined. Also, the IRED current is set to be the maximum possible value at that driving frequency, and the flow returns to step S406A.

S406D: In order to optimize the charge accumulation time per emission by shortening the times t1 and t2 by changing the output timings of the pulses ICG, if the times t1 and t2 do not assume minimum values, the flow advances to step S406E.

S406E: The accumulation time is shortened. In this step, the accumulation time is multiplied with ½, but this factor may be appropriately determined. Thereafter, the flow returns to step S406A.

S407: Charges are accumulated for the charge accumulation time determined in the above-mentioned steps, and the signal charges are allowed to build up to a level high enough to perform distance measurement calculations. This processing will be described in detail below with reference to FIG. 15.

S407A: Charges are accumulated for the charge accumulation time determined in the above-mentioned steps.

S407B: It is checked if the level of the accumulated signal charges has reached a predetermined value high enough to perform distance measurement calculations. If the signal level is sufficient, the flow advances to step S408; otherwise, the flow advances to step S407C.

S407C: It is checked if the number of times of charge accumulation has reached a maximum value. When the signal is weak like in a case wherein the object to be measured is present at a far-distance position, charges of sufficient level cannot be accumulated. In order not to senselessly prolong the distance measurement time, the maximum number of times of accumulation is set, and the current number of times of accumulation is compared with this maximum value. If the maximum value has been reached, the flow advances to step S408; otherwise, the flow returns to step S407A to continue accumulation of signal charges.

S408: The distance to the object to be measured is calculated based on the accumulated signal charges.

S409: It is checked based on reliability data concerning the distance to the object to be measured calculated in step S408 if the distance measurement calculation result is adopted.

S410: If it is determined that the distance measurement calculation result is reliable, the distance measurement calculation result is determined to be a distance measurement result.

S411: If it is determined that the distance measurement calculation result is not reliable, the distance to a predetermined fixed point is determined to be a distance measurement result. The fixed point is set at a far-distance or infinity position.

S412: When the release button (not shown) is pressed to its second-stroke position, the second switch changes from the OFF state to the ON state, and the distance measurement operation ends. If the second switch is OFF, the flow advances to step S413.

S413: If the continuous distance measurement mode is selected, the flow returns to step S401 to perform a distance measurement again. If the single distance measurement mode is selected, the control waits until the second switch changes from the OFF state to the ON state.

S414: When the second switch changes from the OFF state to the ON state, a series of photographing operations such as lens driving to an in-focus position, opening/closing the shutter, winding up the film, and the like are performed.

Note that step S402 corresponds to the initialization mode shown in FIG. 8, steps S403 to S407 correspond to the integral mode, and steps S408 to S411 correspond to reading mode.

Reliability Discrimination Method

Figure 32A:
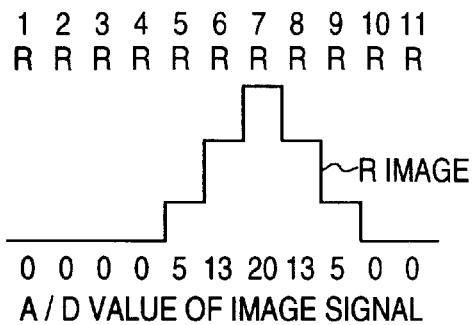
FIGS. 32A to 32F illustrate a method of reliability discrimination according to the first embodiment of the present invention.
Figure 32B:
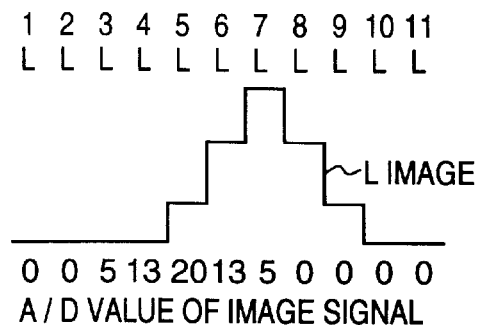
Figure 32C:
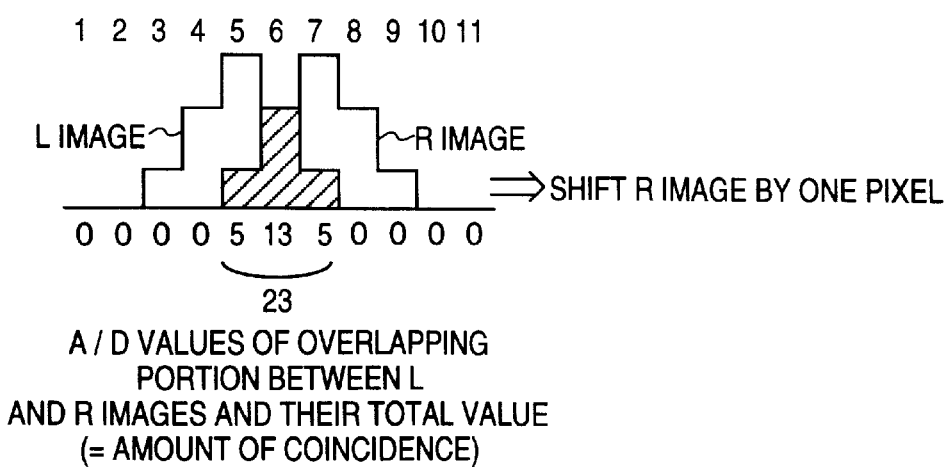
Figure 32D:
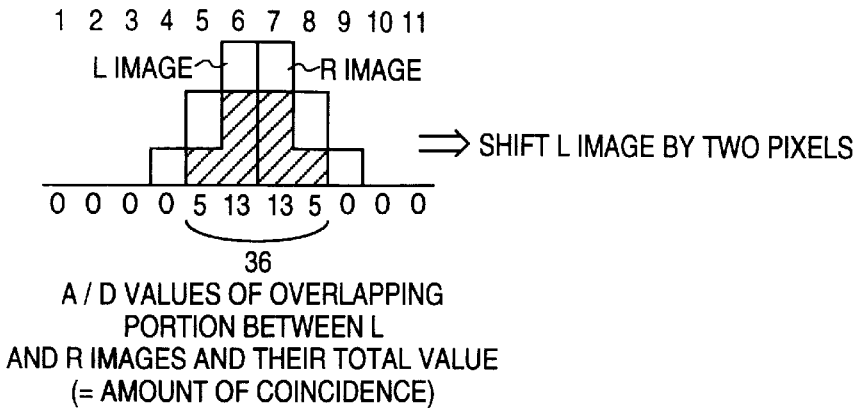
Figure 32E:
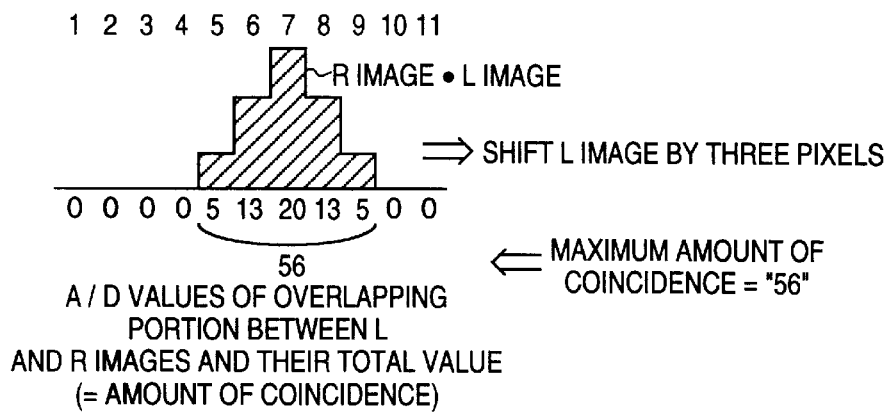
Figure 32F:
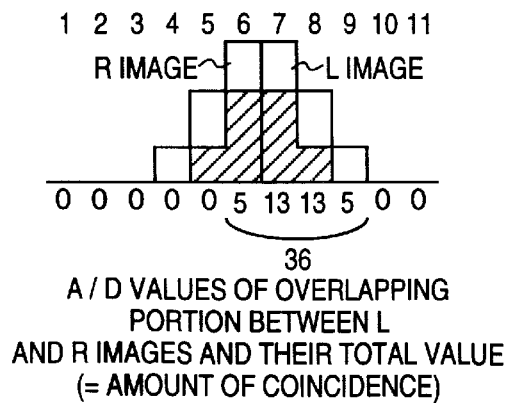

The method of discriminating reliability of the distance measurement calculation result by the reliability discrimination unit G (FIG. 1) will be described below with reference to FIGS. 32A to 32F and FIGS. 33A to 33F. Assume that each of the sensor arrays 11R and 11L in the distance measuring apparatus shown in FIG. 3 is constituted by 11 pixels or more, and a signal waveform corresponding to the 11 pixels is extracted from a signal image formed on these pixels so as to execute the distance measurement calculations. FIG. 32A shows signal waveform data obtained in such a manner that charges obtained by photoelectrically converting a signal image formed on the sensor array 11R based on signal light reflected by the object 221 to be measured are gradually accumulated in the circulating shift register 18R, amplified by the output amplifier 101R, A/D-converted by the A/D converter 204, and written in the memory circuit 211. FIG. 32A shows the pixels of the sensor array in correspondence with the A/D-converted values of the signal amounts accumulated there. FIG. 32B shows signal waveform data obtained in such a manner that charges obtained by photoelectrically converting a signal image formed on the sensor array 11L based on signal light reflected by the object 221 to be measured are gradually accumulated in the circulating shift register 18L, amplified by the output amplifier 101L, A/D-converted by the A/D converter 204, and written in the memory circuit 211. FIG. 32B shows the sensor array in correspondence with the A/D-converted values (A/D values) of the signal amounts of the waveform formed there. FIG. 32C shows the data of the overlapping portion between the signal waveform data of the L and R images. That is, FIG. 32C shows the data calculated by the CPU 210 (more specifically, the smaller A/D values of the two image data are used as the values of the overlapping portion). A sum of the A/D values in the overlapping portion is defined as the amount of coincidence. FIG. 32D shows the data, calculated by the CPU 210, of the overlapping portion between the two image data after the signal waveform data of the L image is shifted by one pixel in a direction indicated by an arrow. Similarly, FIGS. 32E and 32F show the calculation results after the signal waveform data is shifted by two and three pixels, respectively. If the signal waveform data is shifted by two pixels, the L and R images perfectly overlap each other when the amount of coincidence assumes a maximum value "56". In other words, at a point corresponding to the maximum amount of coincidence, the two images overlap each other. The relative distance (Xl–Xr) between the two images can be calculated based on the shift amount until the maximum amount of coincidence is obtained by shifting one signal waveform data (L image in this embodiment), and the size per pixel in the widthwise direction. Accordingly, the distance to the object to be measured can be calculated using equation (3). FIGS. 33A to 33F show a case wherein the L and R images have different shapes, and the amount of coincidence is calculated by shifting the L image by one pixel as in FIGS. 32A to 32F. In this case, the amount of coincidence has a maximum value "35" after the L image is shifted by one pixel, but the two image do not completely coincide with each other at this point, as a matter of course. More specifically, the amount of coincidence increases/decreases in accordance with the degree of coincidence between the two signal waveforms. From the foregoing, it is assumed that the magnitude of the maximum amount of coincidence has a correlation with the degree of coincidence between the two signal waveforms. In this embodiment, if it is defined that "the distance measurement result has no reliability if the amount of coincidence is not more than 40", the distance calculation result calculated based on the signal waveforms shown in FIGS. 32A to 32F is rejected as "one without reliability". Accordingly, the discrimination of the distance measurement result can be attained by comparing the maximum amount of coincidence between two signal waveform data with a predetermined reference value. Under such definition, when two signal images are very small, the amount of coincidence assumes a very small value even when the two images coincide with each other. However, when signal images are small, the influence of noise may be large and, hence, "no reliability" can be determined.

As described above, according to this embodiment, the flickering period of the light projection unit which is driven to flicker and project light beam pulses toward the object to be measured, the distance to which is to be measured, is changed in accordance with the situation of the object to be measured. With this control, low distance measurement performance with respect to the object to be measured present at the far-distance position caused by some lost signal charges inside the signal charge injection unit can be prevented.

When the flickering period of the light projection unit is larger than a predetermined value, the distance measurement mode is inhibited from transiting to a passive distance measurement operation. With this control, distance measurements in a dark situation in which the distance measurement performance in the passive distance measurement mode considerably lowers are inhibited, thus preventing the distance measurement time from being nonsensically prolonged.

The maximum value of the current to be supplied to the light projection unit is limited in correspondence with the flickering frequency of the light projection unit. With this control, the light projection unit can project light with maximum energy without causing thermal destruction or deterioration of the light projection unit. Hence, the far-distance measurement performance of the distance measuring apparatus can be fully utilized.

Also, when the function of continuously operating the distance measuring apparatus to always measure and calculate the distance to the object to be measured is selected, the flickering frequency of the light projection unit is inhibited from being set to be lower than a predetermined value. In this way, the temperature of the light projection unit can be prevented from rising up to a temperature that causes deterioration, and deterioration caused by the temperature rise can be avoided.

Second Embodiment

The second embodiment of the present invention will be described hereinafter.

First, the schematic arrangement and operation of a distance measuring apparatus of this embodiment will be explained with reference to FIG. 16.

Figure 16:
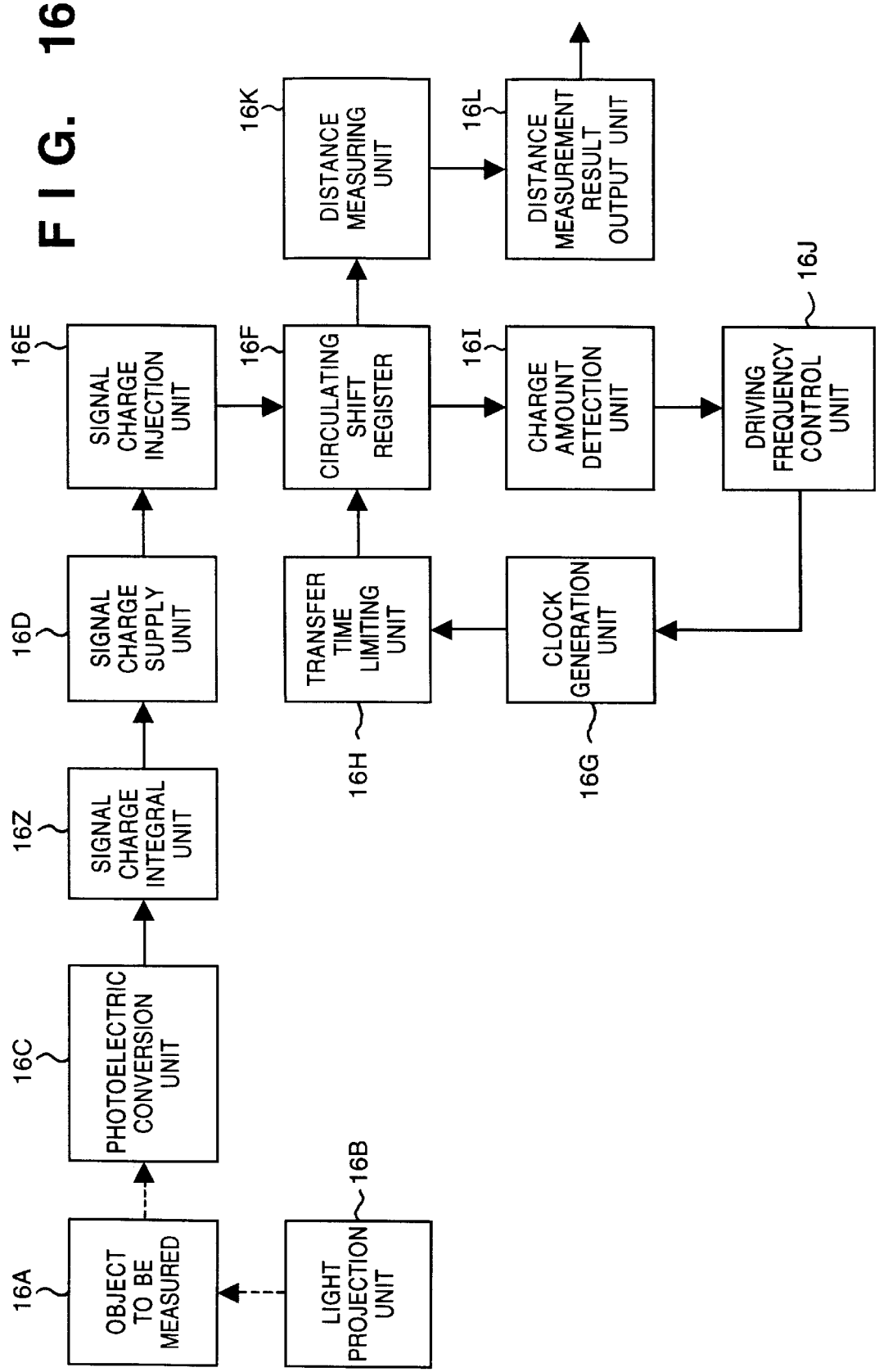
FIG. 16 is a schematic functional block diagram showing the arrangement of a distance measuring apparatus according to the second embodiment of the present invention.

Referring to FIG. 16, reference numeral 16A denotes an object to be measured; 16B, a light projection unit; 16C, a photoelectric conversion unit; 16D, a signal charge supply unit; 16E, a signal charge injection unit; 16F, a circulating shift register; 16G, a clock generation unit; 16H, a transfer time limiting unit; 16I, a charge amount detection unit; 16J, a driving frequency control unit; 16K, a distance measuring unit; and 16L, a distance measurement result output unit.

The light projection unit 16B is driven to flicker and project light beam pulses toward the object 16A to be measured.

The photoelectric conversion unit 16C receives the returning light beam pulses projected by the light projection unit 16B and reflected by the object 16A to be measured, and photoelectrically converts them.

The signal charge supply unit 16D integrates signal charges output from the photoelectric conversion unit 16C using a signal charge integral unit 16Z, and transfers the integrated signal charge in accordance with predetermined charge transfer pulses.

The signal charge injection unit 16E injects the signal charge supplied from the signal charge supply unit 16D into the circulating shift register 16F.

The circulating shift register 16F accumulates signal charges injected via the signal charge injection unit 16E, and comprises, as in the first embodiment, a plurality of charge transfer channel portions, at least some of which are coupled in a loop pattern, transfer electrodes formed on the charge transfer channel portions via gate insulating films, a transfer clock applying unit for applying transfer clocks to the transfer electrodes so as to control the plurality of charge transfer channel portions to transfer charges in a predetermined direction, and an output portion for outputting a voltage signal corresponding to the charge amount present in a predetermined one of the plurality of charge transfer channel portions via a floating gate electrode formed on the predetermined charge transfer channel portion. The circulating shift register 16F circulates charges in the portions coupled in the loop pattern of the charge transfer channel portions to cumulatively add the charges.

The clock generation unit 16G generates clocks for driving the respective units, and can arbitrarily change the frequency of driving clocks to be generated.

The transfer time limiting unit 16H limits the number of rounds of charges on the circulating shift register 16F in correspondence with the frequency of the driving clocks generated by the clock generation unit 16G.

The charge amount detection unit 16I detects whether or not the amount of signal charges accumulated in the circulating shift register 16F exceeds a predetermined amount.

The driving frequency control unit 16J changes the frequency of the driving clocks generated by the clock generation unit 16G from low to high frequency on the basis of the detection output of the charge amount detection unit 16I.

In the distance measuring apparatus of this embodiment with the above arrangement, when the frequency of the driving clocks to be output from the clock generation unit 16G is switched, the maximum number of rounds on the ring for accumulation is changed in correspondence with the switched frequency.

With this control, in the active distance measurement mode, the driving frequency is switched in turn from lower to higher frequency; in the passive distance measurement mode, a low frequency higher than that in the active mode is set as the initial value of the driving frequency, and is switched in turn to higher frequencies.

With this control, distance measurements can be made under suitable conditions in each of the active and passive distance measurement methods. Hence, the distance measurement time can be shortened, and a signal with a high S/N ratio can be assured.

The distance measuring apparatus of this embodiment will be described in more detail below with reference to FIGS. 17 to 20.

Figure 17:
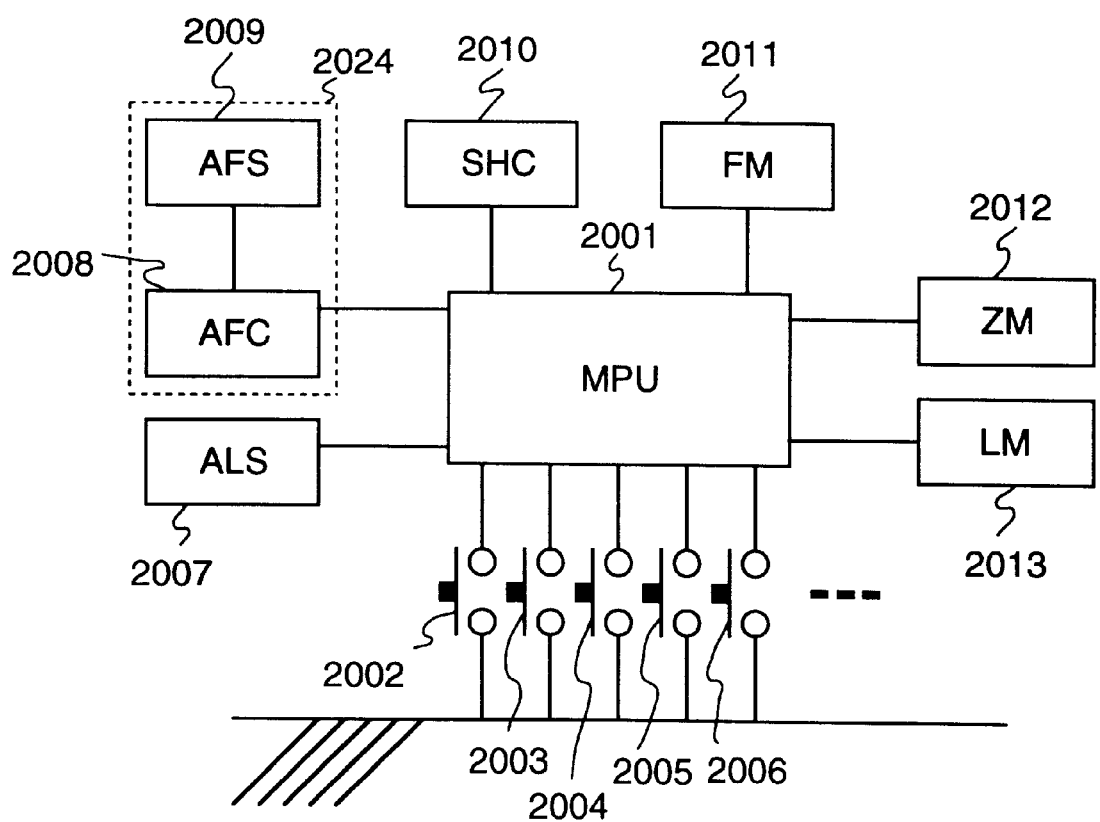
FIG. 17 is a system block diagram of a camera according to the second embodiment of the present invention.

Referring to FIG. 17, an MPU 2001 is a microcomputer having a RAM, ROM, arithmetic unit, and storage unit (none of them are shown), a main switch 2002 is used for turning on/off the power supply of the camera, and a tele switch 2003 is used for driving the lens barrel toward the telephoto side when the power supply of the camera is ON.

A wide switch 2004 is used for driving the lens barrel toward the wide-angle side when the power supply of the camera is ON, and a first switch 2005 is used for starting photographing preparation when the power supply of the camera is ON. When the first switch 2005 is turned on, the camera performs photographing preparation such as photometry, and the like, and waits until a photograph start switch is turned on.

When a second switch 2006 is turned on while the first switch 2005 is ON, the camera drives the lens to an in-focus position in accordance with the distance measurement result, performs exposure, and winds up the film.

An ALS 2007 represents a photometry sensor for measuring the luminance of external light in the photographing mode, includes a temperature sensor (not shown), and outputs a signal corresponding to the measured luminance of external light to the MPU 2001.

A skim CCD is denoted by reference numeral 2024, and comprises an AFC 2008 serving as a distance measurement sensor control unit for measuring the distance to the object in the photographing mode, and a distance measurement sensor depicted as an AFS 2009 in FIG. 17.

An SHC 2010 represents a shutter driving unit, which controls the shutter exposure time using the photometry value obtained by the ALS 2007.

An FM 2011 represents a feed driving unit for winding up a film (not shown) by one frame after exposure.

A ZM 2012 represents a lens barrel driving unit for driving a lens barrel (not shown) to change the focal length when the tele switch 2003 or wide switch 2004 is turned on.

An LM 2013 represents a lens driving unit for driving a lens (not shown) to focus on the object using the distance measurement result.

Figure 18:
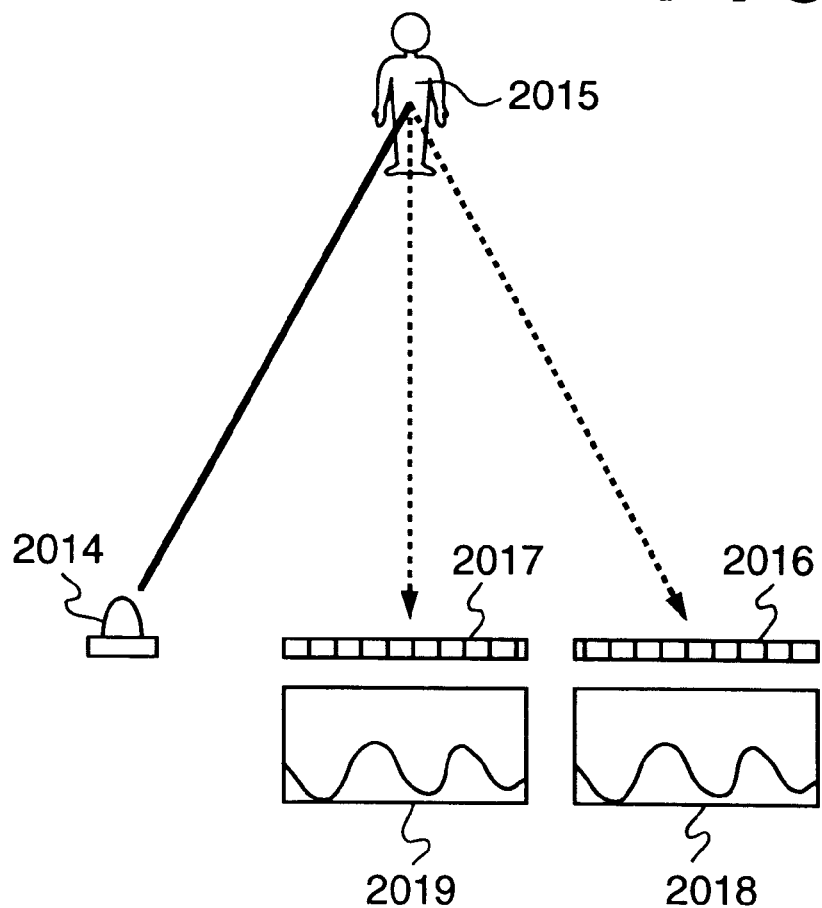
FIG. 18 is a schematic view for explaining a distance measuring system according to the second embodiment of the present invention.

FIG. 18 illustrates a basic distance measuring system of this embodiment.

Referring to FIG. 18, a light projection element 2014 represents a light projection unit such as an LED, IRED, or the like for projecting light toward the object. First and second sensors 2016 and 2017 comprise photoelectric conversion elements for receiving light reflected by the object, and converting their received light amounts into charge amounts. First and second sensor outputs 2018 and 2019 depict the image outputs photoelectrically converted by the sensors 2016 and 2017. Note that the distance measurement method in this embodiment is a phase difference detection method for obtaining the object distance from the phase difference between the two sensor outputs 2018 and 2019 using the principle of trigonometric measurements.

Figure 19:
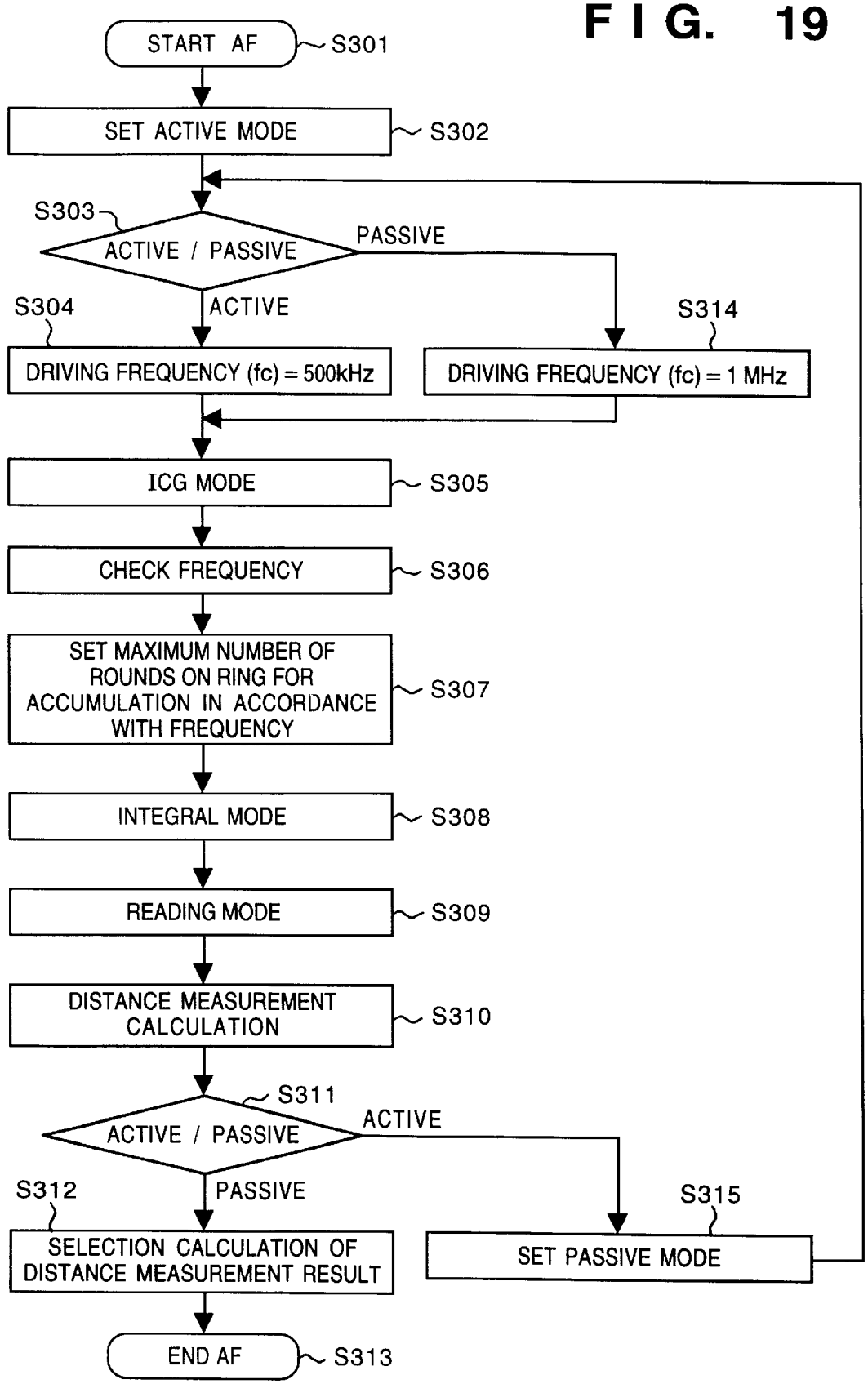
FIG. 19 is a flow chart for explaining the distance measurement sequence according to the second embodiment of the present invention.

FIG. 19 is a flow chart showing the outline of the distance measurement procedure of the distance measuring apparatus of this embodiment.

When the AF operation starts in the first step S301, the active mode is set as the distance measurement mode in step S302, and it is checked in step S303 if the current mode is t he active or passive mode.

As a result, if the current mode is the active mode, the initial value of the driving frequency (fc) is set to be 500 kHz in step S304; otherwise, the initial value of the driving frequency (fc) is set to be 1 MHz in step S314.

In step S305, an ICG mode is executed at the selected driving frequency and by driving to flicker a light-projecting unit such as an IRED if the active mode is selected. In the ICG mode, the external light components incident on the skim CCD are measured to change the accumulation conditions such a s the driving frequency, accumulation time, and the like, so as to accumulate charges under optimal conditions without saturating the skim CCD. The ICG mode will be described later with reference to FIG. 20.

After the driving frequency, accumulation time, and the like are determined in the ICG mode in step S305, the driving frequency is checked in step S306, and the maximum number of rounds on the ring for accumulation is set in correspondence with the driving frequency in step S307. The flow then advances to step S308 to execute the integral mode.

The maximum number of rounds on the ring for accumulation is set to forcibly end the integral mode after charges are accumulated up to the maximum number of rounds on the ring for accumulation when the amount of light incident on the skim CCD is small and the obtained signal is not strong enough to perform distance measurement calculations (mainly, low-luminance, low-reflectance, far-distance objects, and the like).

When the integral mode has ended after charges are accumulated in sufficient amount or accumulation is repeated by the maximum number of rounds on the ring for accumulation, the flow advances to execute the reading mode. In the reading mode, charges obtained in the integral mode are A/D-converted, and the converted image data is stored in a memory of the microcomputer. Thereafter, the object distance is calculated based on the obtained image data in step S310.

After the calculations are complete, it is checked in step S311 if the current mode is the active or passive mode. If the current mode is the active mode, the passive mode is set in step S315. More specifically, the light projection unit is turned off, and thereafter, the same operation as in the active mode is performed to calculate the object distance.

After the object distances are calculated using both the active and passive modes, the flow advances to step S312 to perform a distance measurement result selection calculation so as to select one of the active and passive distance measurement results. Thereafter, the AF processing ends in step S313.

Figure 20:
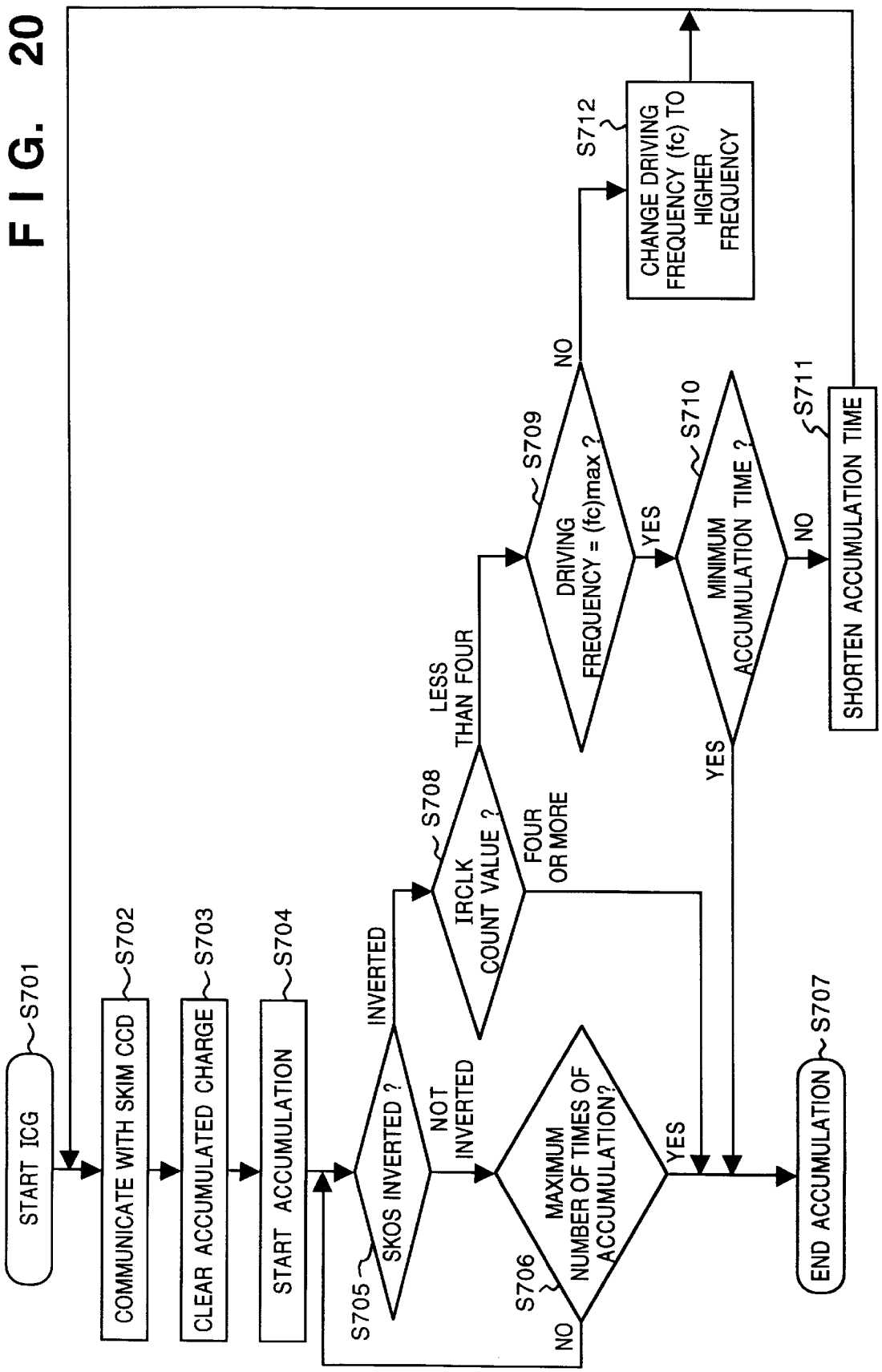
FIG. 20 is a flow chart for explaining the processing sequence in the ICG mode according to the second embodiment of the present invention.

FIG. 20 is a flow chart showing the processing procedure executed in the ICG mode.

When the ICG mode starts in the first step S701, communications are made with the above-mentioned skim CCD 2024 shown in FIG. 17 in step S702.

The charge accumulation time and other accumulation conditions of the skim CCD 2024 can be changed by communicating with the skim CCD 2024, and communication data are set to obtain the longest accumulation time as the initial value of the accumulation time.

After the communications are complete, the residual charges in the skim CCD 2024 are cleared in step S703, and charge accumulation is started in step S704. At the same time, a signal SKOS output from the skim CCD 2024 is monitored. Since this signal SKOS is inverted when the accumulated charges are about to reach saturation during charge accumulation in the ICG mode, whether or not the current charge accumulation conditions are proper can be discriminated by monitoring the time required until the signal SKOS is inverted.

During the accumulation, it is checked in step S705 if the signal SKOS is inverted. If the signal SKOS is inverted, the number of rounds (time period) on the ring required until the signal SKOS is inverted is checked in step S708. If the count value (time period) until the signal SKOS is inverted is equal to or larger than a predetermined value (assumed to be four rounds in the flow chart), the flow advances to step S707 to end the ICG mode.

On the other hand, if it is determined in step S708 that the count value is smaller than four, it is checked in step S709 if the driving frequency is (fc)max. If YES in step S709, the current accumulation time is checked in step S710. If the current accumulation time is not shortest, the accumulation time is shortened in step S711 to repeat the ICG mode again. However, if the current accumulation time is the shortest time, the flow advances to step S707 to end the ICG mode.

If it is determined in step S705 that the signal SKOS is not inverted, the current number of rounds on the ring for accumulation is checked in step S706. If the current number of rounds on the ring for accumulation has not reached the maximum number of rounds on the ring for accumulation yet, accumulation is repeated; otherwise, the flow advances to step S707 to end the ICG mode and to start the next integral mode.

As described above, according to this embodiment, when the driving frequency is switched, the maximum number of rounds on the ring for accumulation is changed in correspondence with the switched frequency. Therefore, in the active distance measurement mode, the driving frequency is switched in turn from lower to higher frequency. In the passive distance measurement mode, a low frequency higher than that in the active mode is set as the initial value of the driving frequency, and is switched in turn to higher frequencies. In this fashion, distance measurements can be made under suitable conditions in each of the active and passive distance measurement methods. Hence, the distance measurement time can be shortened, and a signal with a high S/N ratio can be assured independently of the selected frequency.

Third Embodiment

The third embodiment of the present invention will be described hereinafter.

The schematic arrangement and operation of a distance measuring apparatus of the present invention will be explained with reference to FIG. 21.

Figure 21:
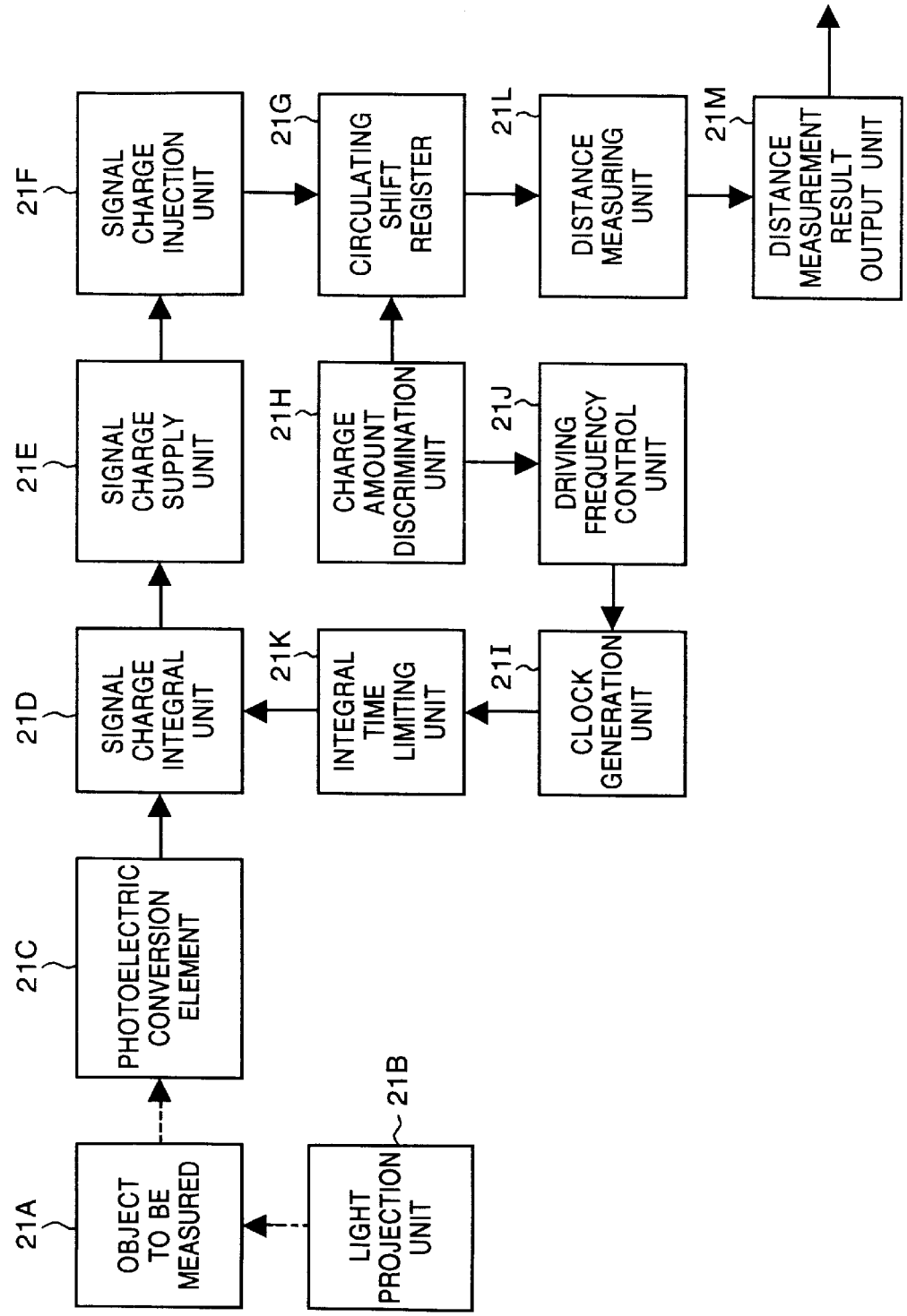
FIG. 21 is a schematic functional diagram showing the arrangement of a distance measuring apparatus according to the third embodiment of the present invention.

Referring to FIG. 21, reference numeral 21A denotes an object to be measured; 21B, a light projection unit; 21C, a photoelectric conversion element; 21D, a signal charge integral unit; 21E, a signal charge supply unit; 21F, a signal charge injection unit; 21G, a circulating shift register; 21H, a charge amount discrimination unit; 21I, a clock generation unit; 21J, a driving frequency control unit; 21K, an integral time control unit; 21L, a distance measuring unit; and 21M, a distance measurement result output unit.

The light projection unit 21B is driven to flicker and project light beam pulses toward the object 21A to be measured.

The photoelectric conversion element 21C receives the returning light beam pulses projected by the light projection unit 21B and reflected by the object 21A to be measured, and photoelectrically converts them.

The signal charge integral unit 21D can arbitrarily set the integral time of signal charges output from the photoelectric conversion element 21C.

The signal charge supply unit 21E transfers the signal charge integrated by the signal charge integral unit 21D in accordance with predetermined charge transfer pulses.

The signal charge injection unit 21F injects the signal charge transferred by the signal charge supply unit 21E into the circulating shift register 21G arranged at the next stage.

The circulating shift register 21G comprises a plurality of charge transfer channel portions including some portions coupled in a loop pattern, a plurality of transfer electrodes formed on the charge transfer channel portions via gate insulating films, and a floating gate electrode which operates in response to transfer clocks applied to the transfer electrodes, and is formed via a gate oxide film so as to detect the amount of signal charges transferred in the charge transfer channel portions. The circulating shift register 21G circulates charges in the portions coupled in the loop pattern of the charge transfer channel portions to cumulatively add the charges.

The circulating shift register 21G gradually accumulates signal charges injected from the signal charge injection unit 21F.

The charge amount discrimination unit 21H discriminates the charge amount accumulated in the circulating shift register 21G.

The clock generation unit 21I generates clocks for driving the respective units, and can arbitrarily vary the driving clocks to be generated.

The driving frequency control unit 21J controls the operation of the clock generation unit 21I in accordance with an output signal from the charge amount discrimination unit 21H to sequentially switch the driving clocks from the lower frequency side toward the higher frequency side.

When the frequency of the driving clocks has reached a predetermined driving frequency, the integral time control unit 21K controls to sequentially shorten the integral time of signal charges performed at the driving frequency in the signal charge integral unit 21D.

In the distance measuring apparatus of this embodiment with the above arrangement, the driving frequency of the skim CCD is switched from lower to higher frequency before the accumulation time is changed in accordance with the amount of incident light in the ICG mode that determines the accumulation conditions of signal charges.

If the accumulated charges reach saturation, the accumulation time of signal charges by the signal charge integral unit 21D is shortened under the control of the integral time control unit 21K, so as to optimize signal charge accumulation while preventing charge saturation in a high-luminance state.

In this way, the distance measuring apparatus can obtain high transfer efficiency and sufficient signal components in a low-luminance state. Also, since charge saturation can be prevented in a high-luminance state, best signal component accumulation can be attained in distance measurements under various conditions.

The distance measuring apparatus of the present invention will be described in detail below with reference to the accompanying drawings.

Since an example in which the distance measuring apparatus according to this embodiment is applied to a camera and the brief description of the distance measuring system is the same as those in FIGS. 17 and 18, a detailed description thereof will be omitted.

The AF processing in this embodiment will be described below.

Figure 22:
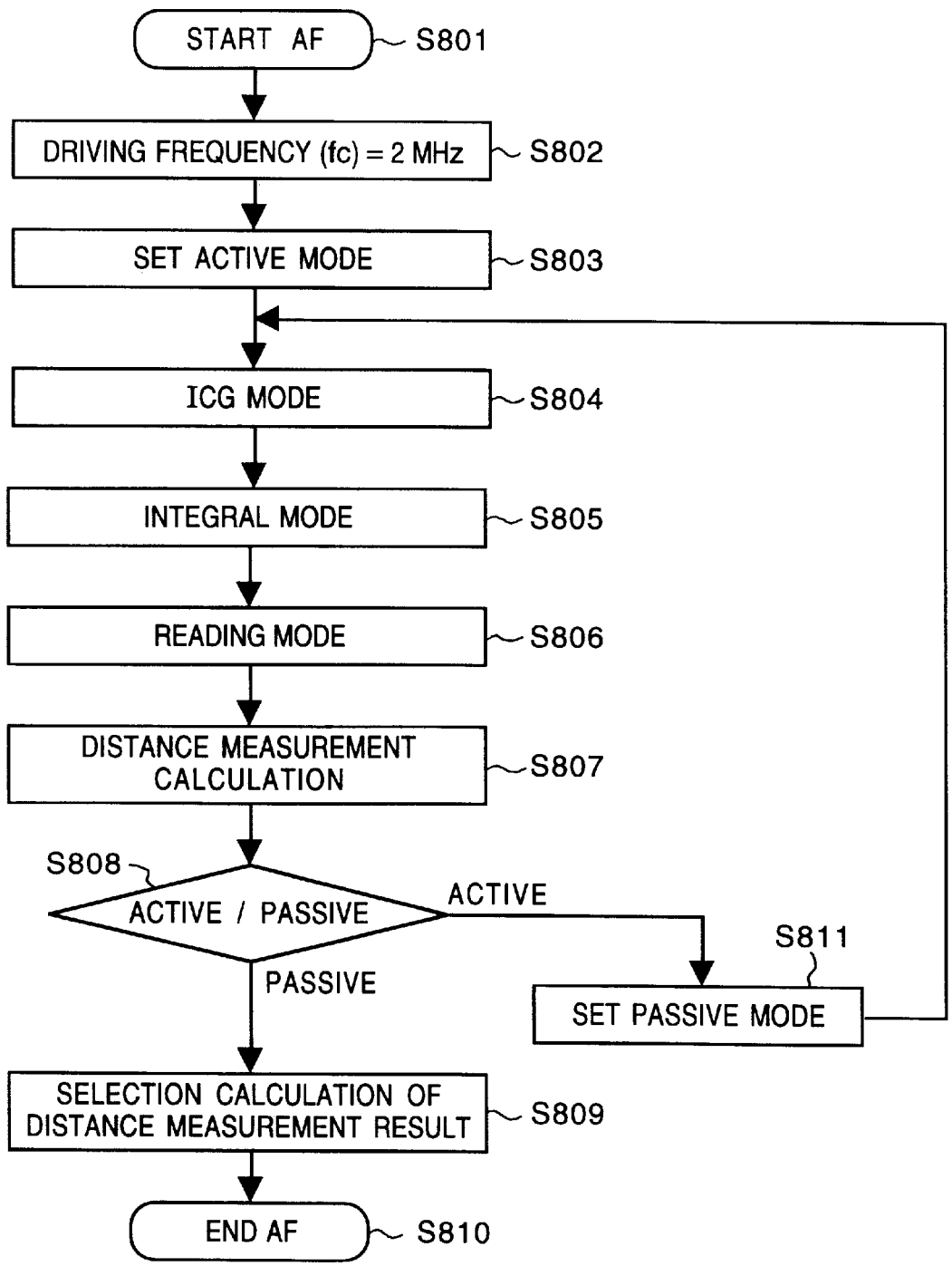
FIG. 22 is a flow chart for explaining the distance measurement sequence according to the third embodiment of the present invention.

FIG. 22 is a flow chart showing the AF sequence.

When the AF processing starts in the first step S801, the driving frequency (fc) of the skim CCD is set to be 2 MHz in step S802. In step S803, the active mode is set as the distance measurement mode to drive to flicker the light projection unit such as an IRED, and the ICG mode in step S804 is executed.

In the ICG mode, the external light components incident on the skim CCD are measured to change the accumulation conditions such as the driving frequency, accumulation time, and the like, so as to accumulate charges under optimal conditions without saturating the skim CCD.

After the driving frequency, accumulation time, and the like are determined in the ICG mode, the flow advances to step S805 to execute the integral mode. In this mode, the maximum number of rounds on the ring for accumulation is set, and the skim CCD is controlled in accordance with the accumulation time determined in the ICG mode.

The maximum number of rounds on the ring for accumulation is set to forcibly end the integral mode after charges are accumulated up to the maximum number of rounds on the ring for accumulation when the amount of light incident on the skim CCD is small and the obtained signal is not strong enough to perform distance measurement calculations (mainly, low-luminance, low-reflectance, far-distance objects, and the like).

When the integral mode has ended after charges are accumulated in sufficient amount or accumulation is repeated by the maximum number of rounds on the ring for accumulation, the flow advances to step S806 to execute the reading mode. In the reading mode, charges obtained in the integral mode are A/D-converted, and the converted image data is stored in a memory of the microcomputer.

Thereafter, the object distance is calculated based on the obtained image data in step S807. After the calculations are complete, it is checked in step S808 if the current mode is the active or passive mode. If the current mode is the active mode, the passive mode is set in step S811. In the passive mode, the light projection unit is turned off, and thereafter, the same operation as in the active mode is performed to calculate the object distance.

After the object distances are calculated using both the active and passive modes, the flow advances to step S809 to perform a distance measurement result selection calculation so as to select one of the active and passive distance measurement results. Thereafter, the AF processing ends in step S810.

Figure 23:
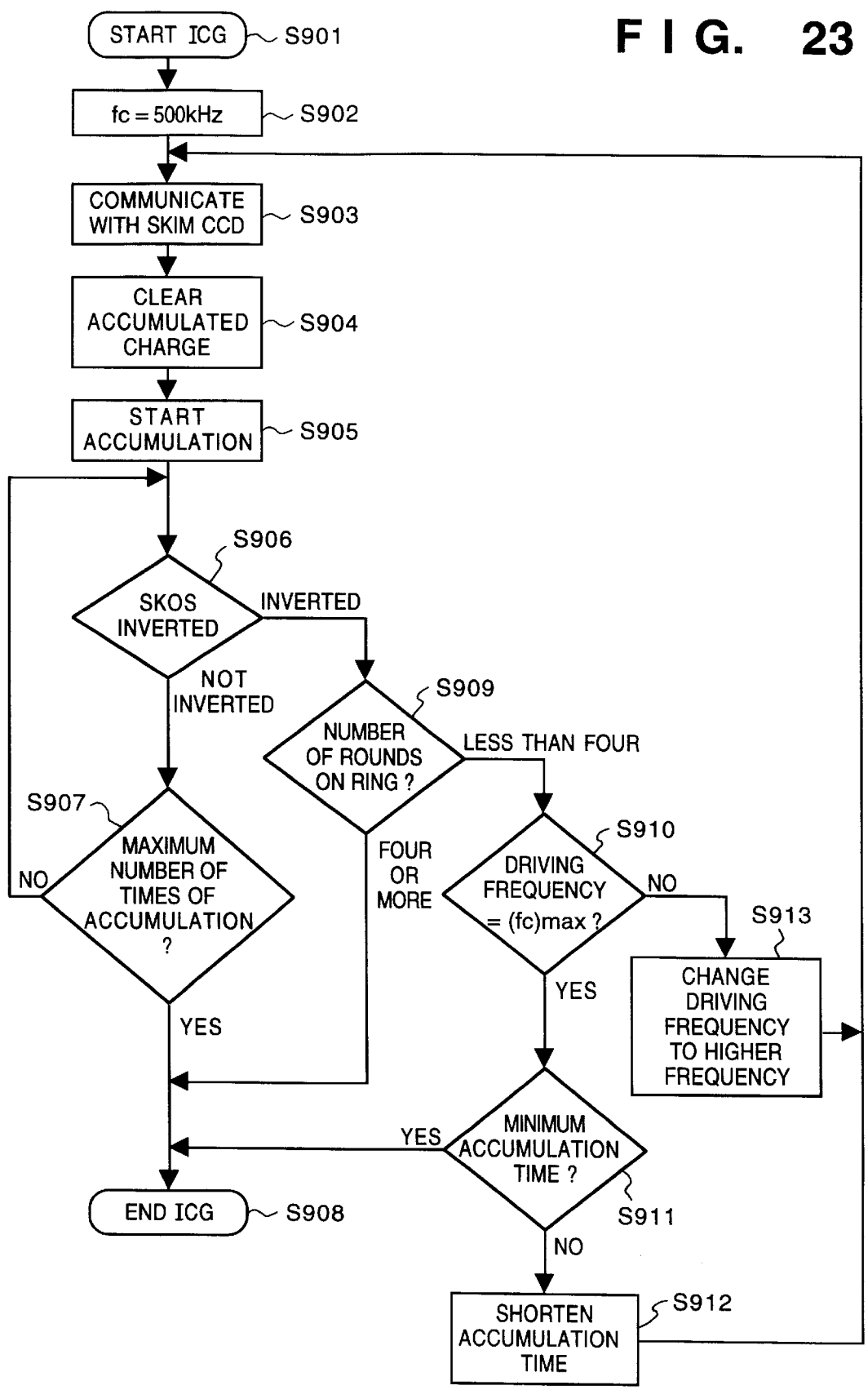
FIG. 23 is a flow chart for explaining the ICG mode according to the third embodiment of the present invention.

FIG. 23 is a flow chart showing the sequence executed in the ICG mode of this embodiment.

When the ICG mode starts in the first step S901, the driving frequency of the skim CCD 2024 is set to be 500 kHz as the lowest driving frequency in step S902.

The charge accumulation time and other accumulation conditions of the skim CCD 2024 can be changed by communicating with the skim CCD 2024, and communication data are set to obtain the longest accumulation time as the initial value of the accumulation time. In step S903, communications with the skim CCD 2024 are made.

After the communications are complete, the residual charges in the skim CCD 2024 are cleared in step S904, and charge accumulation is started in step S905. At the same time, a signal SKOS output from the skim CCD 2024 is monitored.

The signal SKOS is inverted when the accumulated charges are about to reach saturation during charge accumulation in the ICG mode, whether or not the current charge accumulation conditions are proper can be discriminated by monitoring the time required until the signal SKOS is inverted.

During the accumulation, it is checked in step S906 if the signal SKOS is inverted. If the signal SKOS is inverted, the flow advances to step S909 to check the number of rounds (time period) on the ring required until the signal SKOS is inverted.

If the number of rounds (time period) on the ring until the signal SKOS is inverted is equal to or larger than a predetermined value (assumed to be four rounds in the flow chart), the flow advances to step S910 to check the frequency, and then advances to step S911 to check the charge accumulation time.

As a result of checking in step S910, if the driving frequency is not the minimum one, the flow advances to step S913 to increase the driving frequency.

On the other hand, as a result of checking in step S911, if the accumulation time is not the minimum one, the flow advances to step S912 to shorten the accumulation time, thereby changing the accumulation conditions, so that the signal SKOS is not inverted within the predetermined number of rounds on the ring.

More specifically, if the signal SKOS is inverted in step S906, the count value of the number of rounds on the ring is checked. If the count value is smaller than a predetermined count (assumed to be four rounds in this flow chart), the driving frequency of the skim CCD 2024 is checked in step S910.

On the other hand, as a result of checking in step S910, if the driving frequency is the highest one, the flow advances to step S911; if the set driving frequency is not highest, the driving frequency is changed to a higher frequency in step S913 to execute the ICG mode again.

If it is determined in step S910 that the driving frequency is set to be the highest frequency, the accumulation time is checked in step S911. If the set accumulation time is the shortest time, the flow advances to step S908 to end the ICG mode and to execute the next integral mode. However, if it is determined in step S911 that the accumulation time is not shortest, the flow advances to step S912 to re-set a shorter accumulation time.

On the other hand, if it is determined in step S906 that the signal SKOS is not inverted, the flow advances to step S907 to check the counted number of rounds on the ring. As a result of checking in step S907, if the counted number of rounds on the ring has exceeded the maximum number of rounds on the ring for accumulation, the accumulation is stopped, and the flow advances to step S908 to end the ICG mode and to execute the next integral mode.

Figure 24:
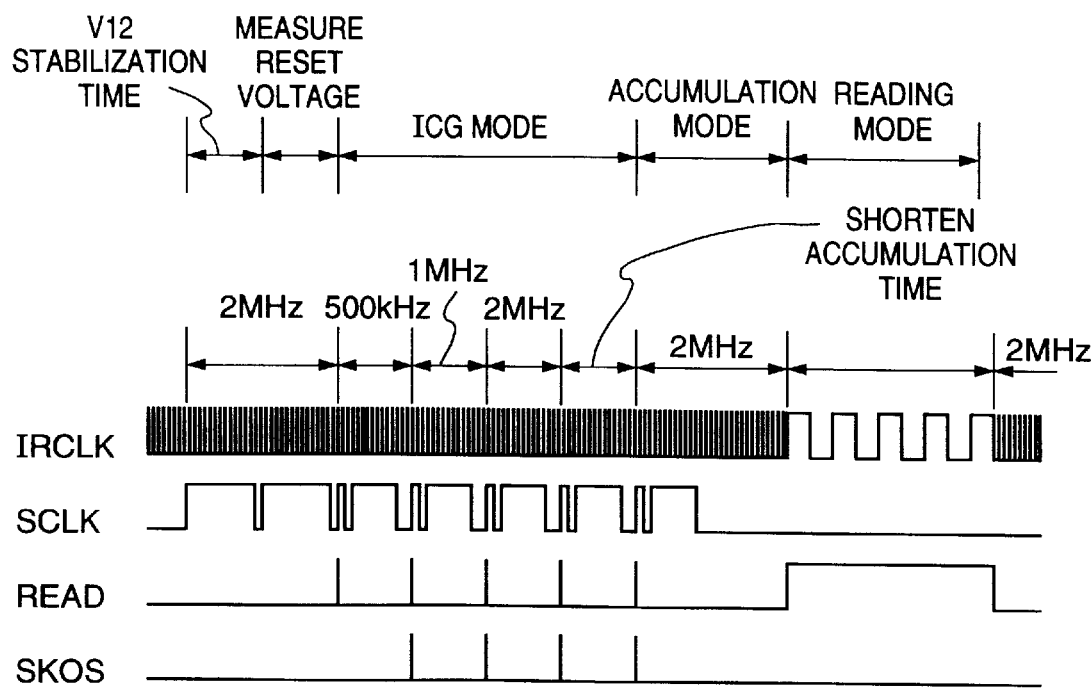
FIG. 24 is a timing chart showing the principal waveforms of a skim CCD in the ICG mode according to the third embodiment of the present invention.

FIG. 24 is a timing chart showing the timings of principal waveforms when the driving frequency of the skim CCD 2024 changes from the lowest frequency to the highest frequency and the accumulation time is shortened by one step in this embodiment.

In FIG. 24, the IRED is turned on in synchronism with a signal IRCLK, which serves as a reference clock upon changing the accumulation conditions in the ICG mode.

A signal SKOS outputs the accumulated charge in accordance with the setting conditions of the skim CCD 2024 at the output terminal of the skim CCD 2024.

In the ICG mode, the initial value of the driving frequency of the skim CCD 2024 is set to be 500 kHz. In this case, since the signal SKOS is inverted before the counted number of rounds (=signals IRCLK) on the ring reaches four (this value may be arbitrarily set, and is not particularly limited to four rounds), the driving frequency is switched to 1 MHz, and the ICG mode is executed again. Even in this state, since the signal SKOS is inverted before the counted number of rounds (=signals IRCLK) on the ring reaches four, the driving frequency is switched to 2 MHz. However, the signal SKOS is still inverted.

However, in this case, since the driving frequency is 2 MHz as the highest setting value, the driving frequency is left unchanged, and the accumulation time is shortened. Thereafter, it is checked if the signal SKOS is inverted before the counted number of rounds (=signals IRCLK) on the ring reaches four. In this case, since the signal SKOS is not inverted before the counted number of rounds on the ring reaches four, the control enters the integral mode as the next sequence.

Figure 25:
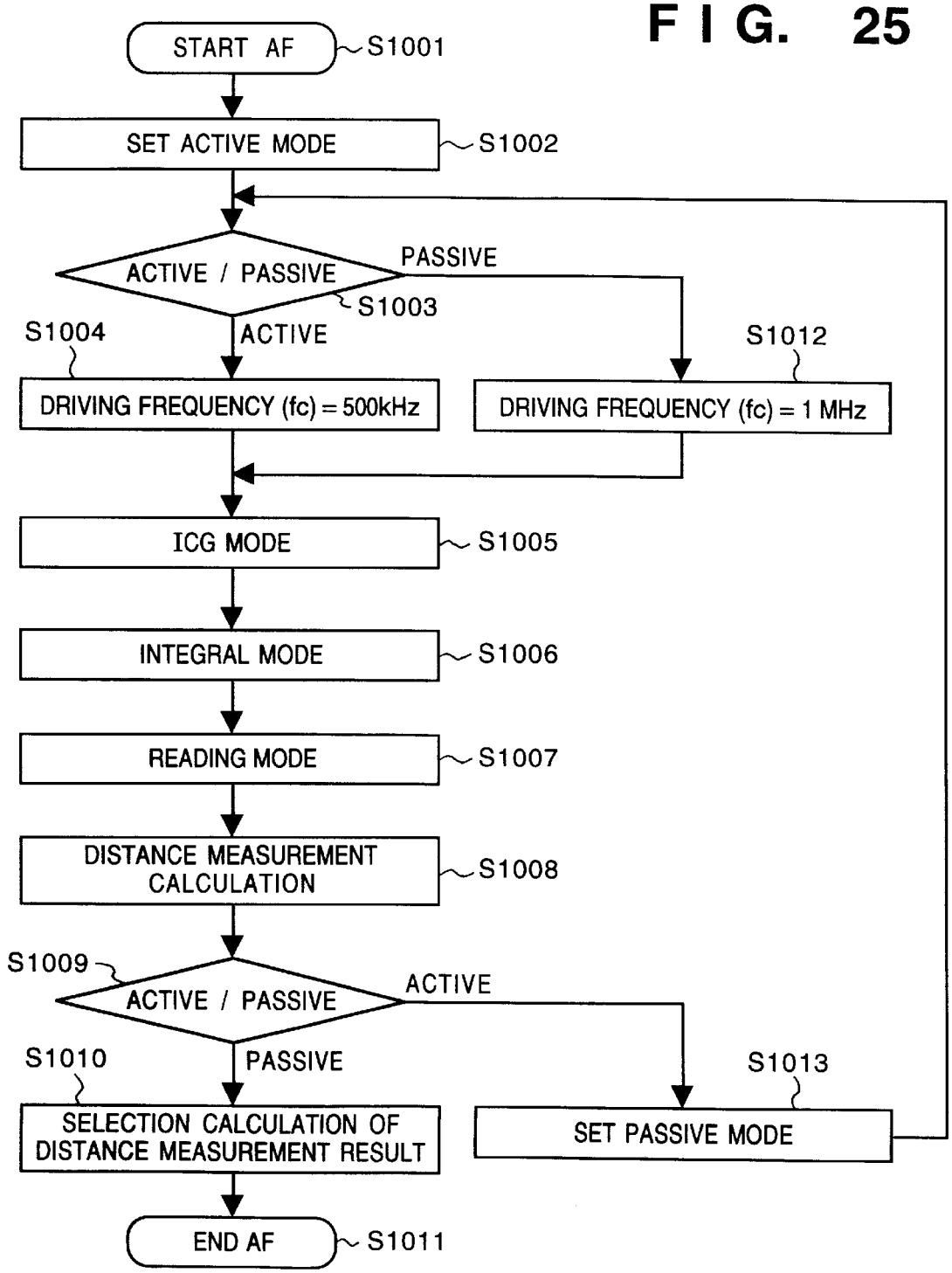
FIG. 25 is a flow chart for explaining the distance measurement sequence according to a modification of the third embodiment of the present invention.
Figure 26:
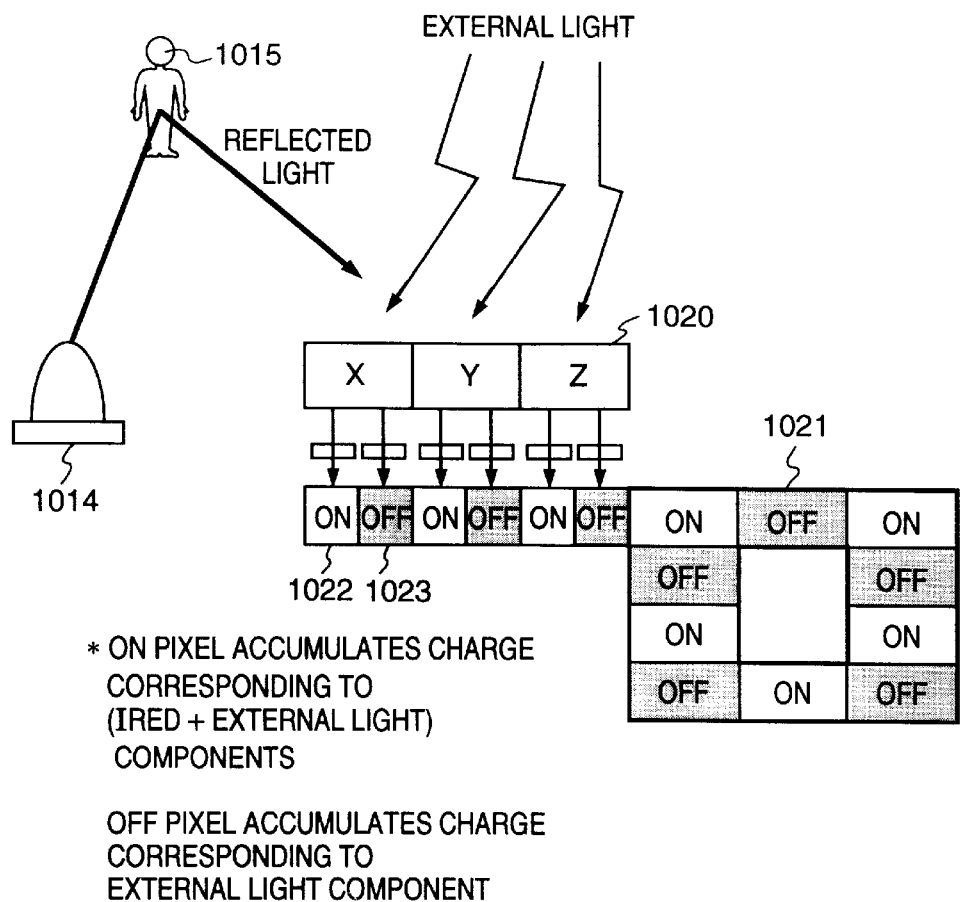
FIG. 26 is a schematic view for explaining the principle of a skim CCD.
Figure 27:
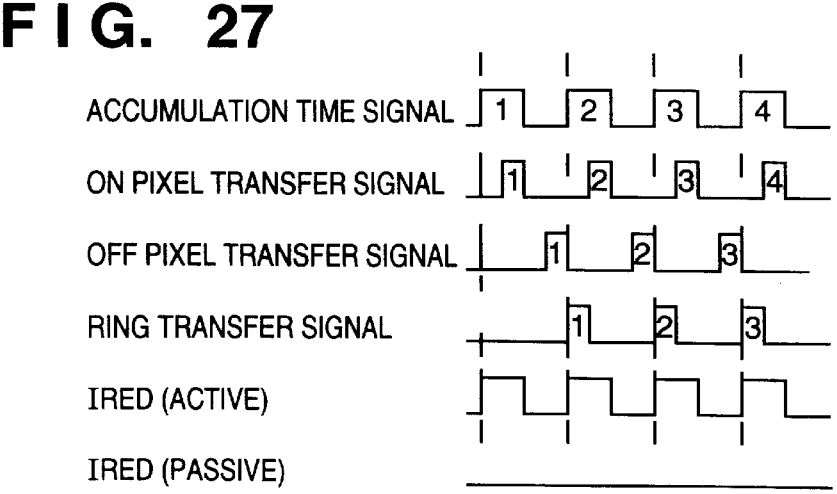
FIG. 27 is a timing chart showing the charge transfer timings.
Figure 28:
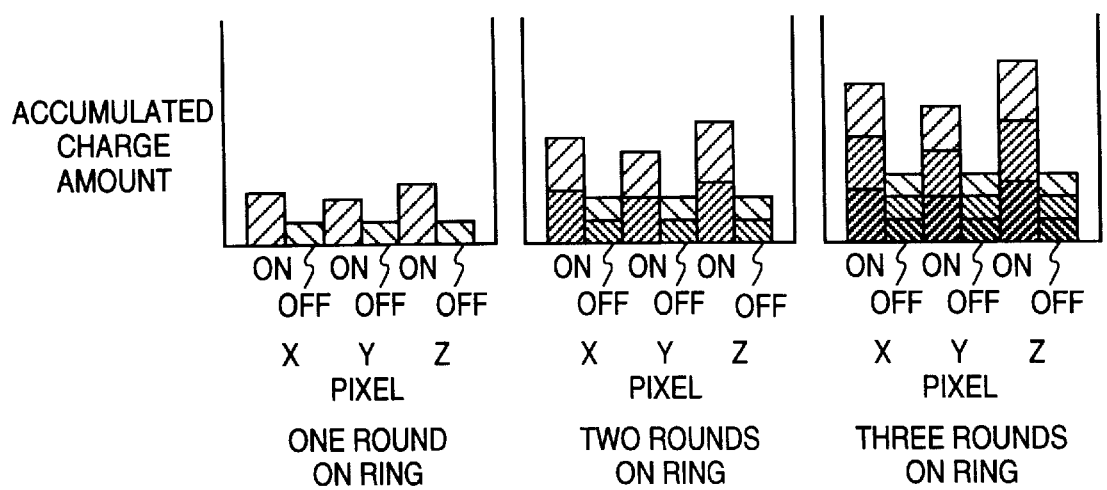
FIG. 28 is a view showing the relationship between the number of rounds on a ring and the accumulated charge amount.
Figure 29:
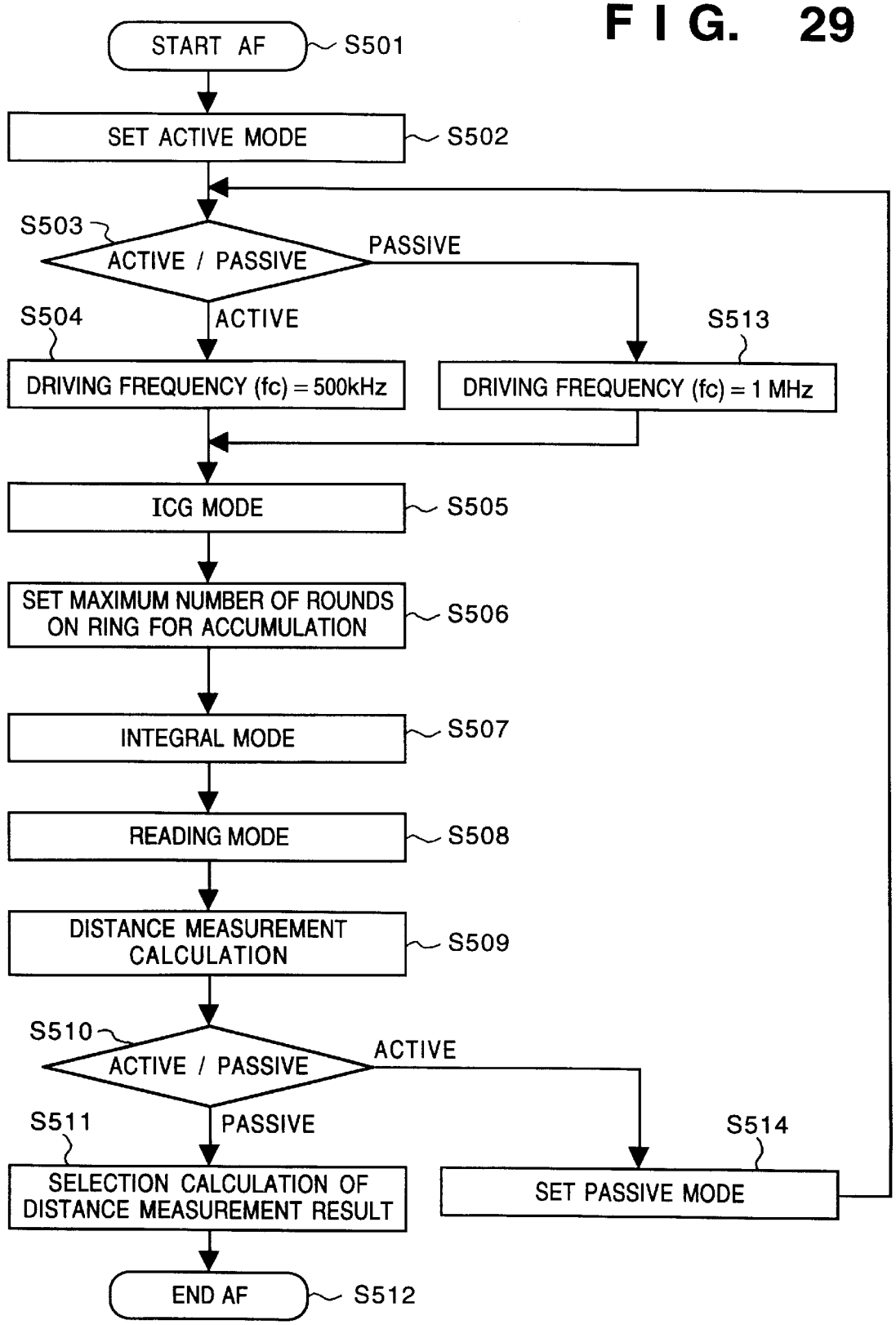
FIG. 29 is a flow chart for explaining the conventional distance measurement sequence.
Figure 30:
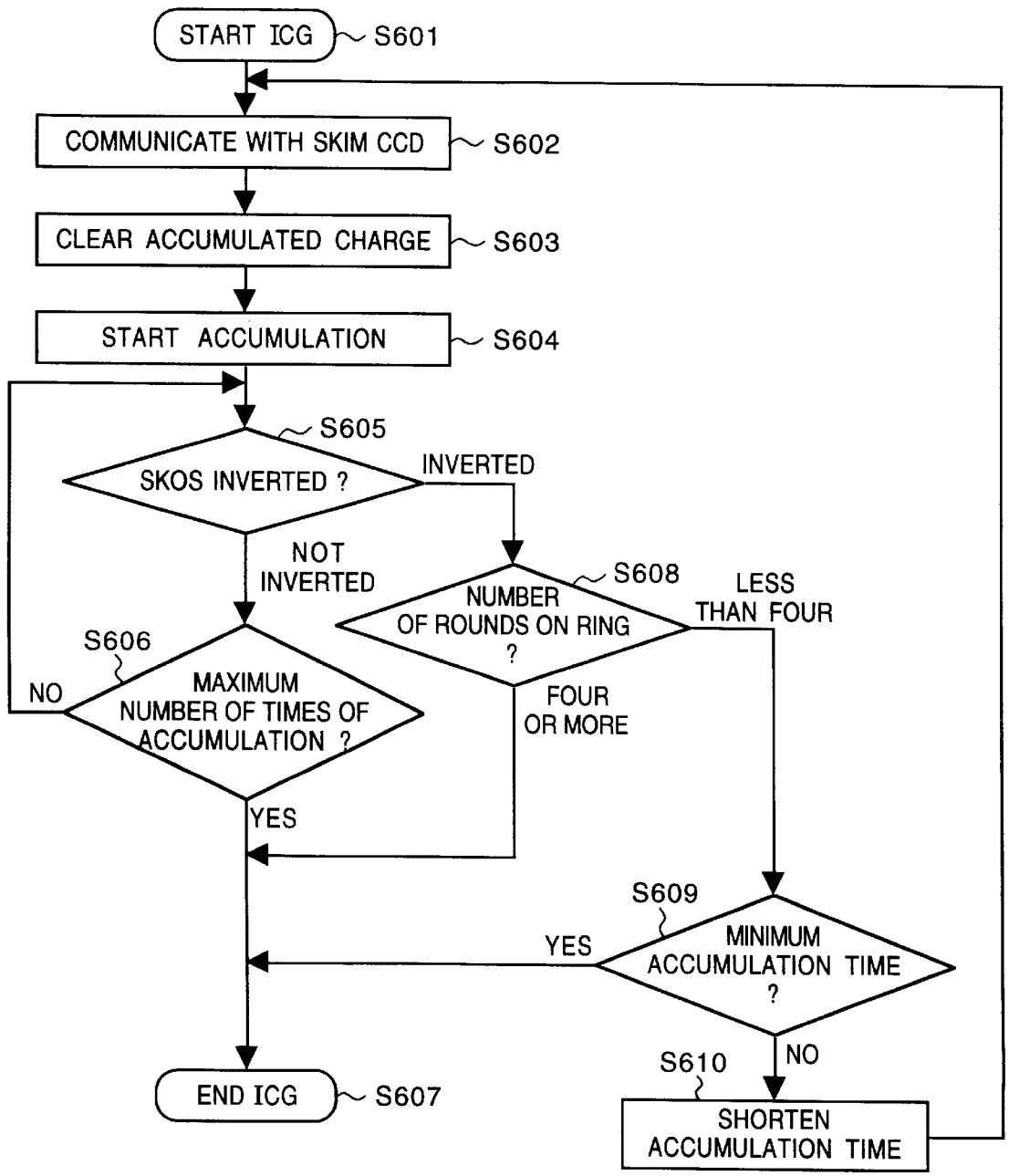
FIG. 30 is a flow chart showing the processing sequence in the conventional ICG mode.
Figure 31:
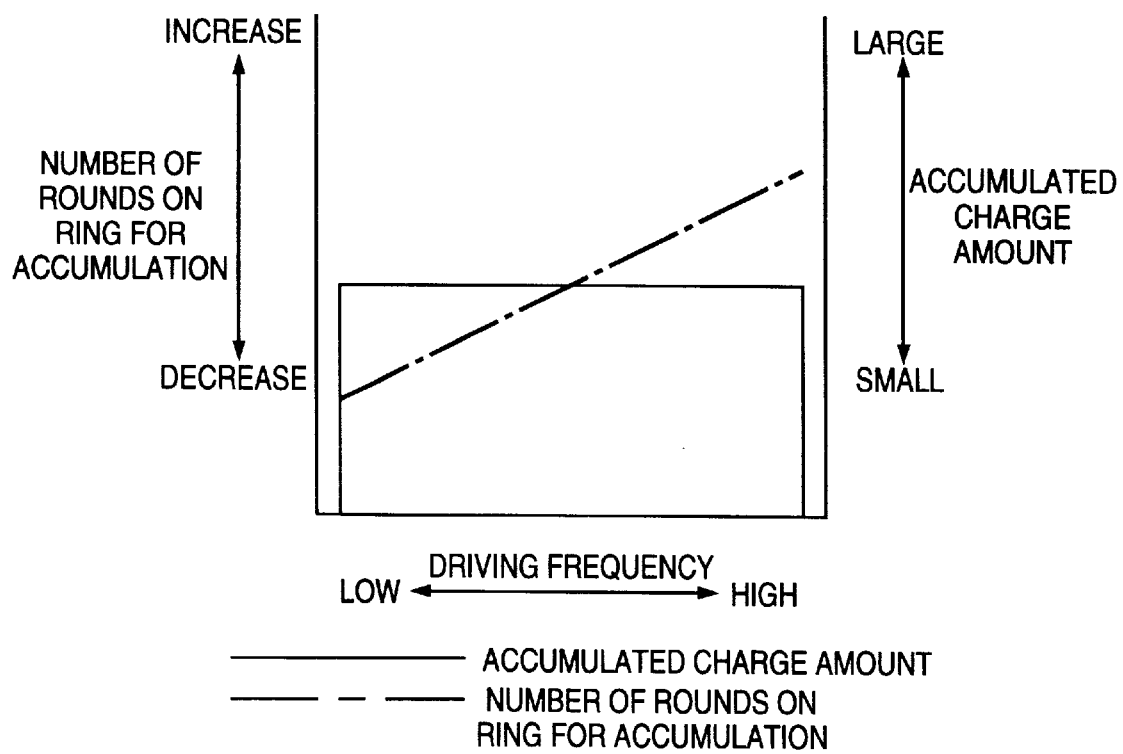
FIG. 31 is a schematic view for explaining the principle of the skim CCD.

FIG. 25 is a flow chart showing the outline of the distance measurement sequence of the distance measuring apparatus according to a modification of the third embodiment of the present invention.

When the AF processing starts in the first step S1001, the active mode is set as the distance measurement mode in step S1002, and it is checked in step S1003 if the current mode is the active or passive mode.

As a result of checking, if the current mode is the active mode, the initial value of the driving frequency (fc) is set to be 500 kHz in step S1004, and the light projection unit such as an IRED is driven to flicker. On the other hand, if the current mode is the passive mode, the flow advances to step S1012 to set 1 MHz as the initial value of the driving frequency (fc), thus executing the ICG mode.

In the ICG mode, external light components incident on the skim CCD are measured to change the accumulation conditions such as the driving frequency, accumulation time, and the like, so as to accumulate charges under optimal conditions without saturating the skim CCD. Note that the ICG mode has already been described above with reference to FIG. 23.

After the driving frequency, accumulation time, and the like are determined in the ICG mode, the maximum number of rounds on the ring for accumulation is set in the integral mode in step S1006 to perform change accumulation. The maximum number of rounds on the ring for accumulation is set to forcibly end the integral mode after charges are accumulated up to the maximum number of rounds on the ring for accumulation when the amount of light incident on the skim CCD is small and the obtained signal is not intense enough to perform distance measurement calculations (mainly, low-luminance, low-reflectance, far-distance objects, and the like).

When the integral mode has ended after charges are accumulated in sufficient amount or accumulation is repeated by the maximum number of rounds on the ring for accumulation, the flow advances to step S1007 to execute the reading mode. In the reading mode, charges obtained in the integral mode are A/D-converted, and the converted image data is stored in a memory of the microcomputer.

Thereafter, the object distance is calculated based on the obtained image data in step S1008. After the calculations are complete, it is checked in step S1009 if the current mode is the active or passive mode. If the current mode is the active mode, the passive mode is set in step S1013. In this mode, the light projection unit is turned off, and thereafter, the same operation as in the active mode is performed to calculate the object distance.

After the object distances are calculated using both the active and passive modes, the flow advances to step S1010 to perform a distance measurement result selection calculation so as to select one of the active and passive distance measurement results. Thereafter, the AF processing ends in step S1011.

As described above, according to this embodiment, the driving frequency of the signal charge integral unit is set to be a lower frequency during accumulation of signal charges, and when accumulated charges reach saturation, the frequency is switched in turn to a higher frequency. In addition, if saturation cannot be avoided by switching the frequency alone to a higher frequency, the accumulation time is shortened. With this control, high transfer efficiency can be obtained in a low-luminance state, and signal components of sufficient level can be obtained. Also, charge saturation in a high-luminance state can be prevented. Accordingly, best signal component accumulation can always be warranted in distance measurements under various conditions.

In consideration of the performance and characteristics of the active and passive modes, when distance measurements are made in the active distance measurement mode, the driving frequency is switched in turn from lower to higher frequency. On the other hand, when distance measurements are made in the passive distance measurement mode, a low frequency higher than that in the active distance measurement mode is set as the initial value, and thereafter, the frequency is switched to higher frequencies. In this fashion, distance measurements under poor conditions that cannot obtain a reliable result can be inhibited, and the distance measurement time can be greatly shortened without impairing the distance measurement performance.

Note that a distance measuring apparatus obtained by combining the above embodiments is included in the scope of the present invention although a description thereof is omitted for the sake of simplicity.

As many apparently widely different embodiments of the present invention can be made without departing from the spirit and scope thereof, it is to be understood that the invention is not limited to the specific embodiments thereof except as defined in the appended claims.

What is claimed is:

1. A distance measuring apparatus, which comprises light projection means driven to flicker and project light beam pulses onto an object, and distance measuring means for measuring a distance to the object on the basis of reflected light obtained by projecting the light beam pulses onto the object, comprising:

detection means for detecting a situation of the object;

flickering frequency changing means for changing a flickering frequency of said light projection means in accordance with the situation of the object detected by said detection means; and photoelectric conversion means, signal charge integral means, signal charge supply means, signal charge injection means, and a circulating shift register, wherein said photoelectric conversion means comprises a plurality of photoelectric conversion elements for photoelectrically converting the light beam pulses consequently obtained when the light beam pulses projected from said light projection means are reflected by the object, and outputting signal charges, said signal charge integral means integrating the signal charges respectively output from said plurality of photoelectric conversion elements, said signal charge supply means transferring the signal charge integrated by said signal charge integral means to said signal charge injection means in accordance with a predetermined pulse, said signal charge injection means injecting the signal charge transferred by said signal charge supply means into said circulating shift register, said circulating shaft register accumulating the signal charge injected from said signal charge injection means, and said distance measuring means calculates the distance to the object on the basis of the signal charge accumulated in said circulating shift register.

2. The apparatus according to claim 1, wherein said distance measuring means can operate in one of an active mode for measuring distance by driving said light projection means to emit light, and a passive mode for measuring distance without driving said light projection means to emit light, and said apparatus further comprises inhibition means for, when the flickering period of said light projection means is longer than a predetermined period, inhibiting transition to the passive mode.

3. The apparatus according to claim 2, wherein when said inhibition means inhibits transition to the passive mode, said distance measuring means outputs a pre-stored predetermined value as a calculation result.

4. The apparatus according to claim 1, further comprising:

reliability discrimination means for discriminating reliability of the distance to the object obtained by said distance measuring means;

signal charge reset means for, when said reliability discrimination means determines that the result obtained by said distance measuring means is not reliable, turning off said light projection means, and resetting the signal charge accumulated in said circulating shift register;

signal charge generation means for, when said signal charge reset means resets the accumulated signal charge, generating a new signal charge on the basis of a luminance signal of an image of the object formed on said plurality of photoelectric conversion elements;

second distance measuring means for calculating the distance to the object on the basis of the signal charge generated by said signal charge generation means; and inhibition means for, when the flickering period of said light projection means is longer than a predetermined period, inhibiting transition to a second distance measurement operation.

5. The apparatus according to claim 4, wherein when said inhibition means inhibits transition to the second distance measurement operation, said distance measuring means outputs a pre-stored predetermined value as a calculation result.

6. The apparatus according to claim 4, further comprising maximum current limiting means for limiting a maximum value of a current to be supplied to said light projection means in accordance with the flickering frequency changed by said flickering frequency changing means.

7. The apparatus according to claim 4, further comprising:

continuous operation setting means for continuously operating said distance measuring means; and flickering frequency limiting means for, when said continuous operation setting means sets to continuously operate said distance measuring means, inhibiting a flickering frequency of said light projection means from being set to be lower than a predetermined value.

8. The apparatus according to claim 1, wherein said circulating shift register includes:

a plurality of charge transfer channels, at least some portions of which are coupled in a loop pattern;

a plurality of transfer electrodes formed on said plurality of charge transfer channels via gate insulating films; and a floating gate electrode formed via a gate oxide film to detect an amount of signal charges transferred in said charge transfer channels on the basis of a transfer clock applied to said plurality of transfer electrodes, and said circulating shift register cumulatively adds charges by circulating charges in the portions coupled in the loop pattern of said charge transfer channels.

9. The apparatus according to claim 8, further comprising:

reliability discrimination means for discriminating reliability of the distance to the object obtained by said distance measuring means;

signal charge reset means for, when said reliability discrimination means determines that the result obtained by said distance measuring means is not reliable, turning off said light projection means, and resetting the signal charge accumulated in said circulating shift register;

signal charge generation means for, when said signal charge reset means resets the accumulated signal charge, generating a new signal charge on the basis of a luminance signal of an image of the object formed on said plurality of photoelectric conversion elements;

second distance measuring means for calculating the distance to the object on the basis of the signal charge generated by said signal charge generation means; and inhibition means for, when the flickering period of said light projection means is longer than a predetermined period, inhibiting transition to a second distance measurement operation.

10. The apparatus according to claim 9, wherein when said inhibition means inhibits transition to the second distance measurement operation, said distance measuring means outputs a pre-stored predetermined value as a calculation result.

11. The apparatus according to claim 9, further comprising maximum current limiting means for limiting a maximum value of a current to be supplied to said light projection means in accordance with the flickering frequency changed by said flickering frequency changing means.

12. The apparatus according to claim 9, further comprising:
   continuous operation setting means for continuously operating said distance measuring means; and
   flickering frequency limiting means for, when said continuous operation setting means sets to continuously operate said distance measuring means, inhibiting a flickering frequency of said light projection means from being set to be lower than a predetermined value.

13. The apparatus according to claim 1, wherein said signal charge integral means can change an integral time of the signal charges, and
   said apparatus further comprises:
   charge amount discrimination means for discriminating whether or not a charge amount accumulated in said circulating shift register reaches a predetermined amount;
   clock generation means for generating a clock for driving the respective means, said means being able to arbitrarily change a frequency of the driving clock to be generated;
   driving frequency control means for controlling said clock generation means to sequentially switch the frequency of the driving clock from lower to higher frequency in accordance with an output signal from said charge amount discrimination means; and
   integral time control means for, when the frequency of the driving clock has reached a predetermined frequency under the control of said driving frequency control means, controlling said signal charge integral means to sequentially shorten the integral time of the signal charges.

14. The apparatus according to claim 13, wherein said distance measuring means can operate in one of an active mode for measuring distance by driving said light projection means to emit light, and a passive mode for measuring distance without driving said light projection means to emit light, and
   said apparatus further comprises clock initial value setting means which can independently set an initial value of the frequency of the driving clock generated by said clock generation means in the active and passive modes.

15. The apparatus according to claim 14, wherein the initial value in the active mode set by said clock initial value setting means is smaller than the initial value in the passive mode.

16. The apparatus according to claim 13, further comprising transfer time limiting means for limiting the number of rounds of charges on said circulating shift register in accordance with the frequency of the driving clock generated by said clock generation means.

17. The apparatus according to claim 16, wherein said distance measuring means can operate in one of an active mode for measuring distance by driving said light projection means to emit light, and a passive mode for measuring distance without driving said light projection means to emit light, and
   said apparatus further comprises clock initial value setting means which can independently set an initial value of the frequency of the driving clock generated by said clock generation means in the active and passive modes.

18. The apparatus according to claim 17, wherein the initial value in the active mode set by said clock initial value setting means is smaller than the initial value in the passive mode.

19. The apparatus according to claim 1, wherein said detection means detects brightness of the object.

20. A distance measuring apparatus, which comprises light projection means driven to flicker and project light beam pulses onto an object, and distance measuring means for measuring a distance to the object on the basis of reflected light obtained by projecting the light beam pulses onto the object, comprising:
   detection means for detecting a situation of the object; and
   flickering frequency changing means for changing a flickering frequency of said light projection means in accordance with the situation of the object detected by said detection means,
   wherein said distance measuring means can operate in one of an active mode for measuring distance by driving said light projection means to emit light, and a passive mode for measuring distance without driving said light projection means to emit light, and
   said apparatus further comprises inhibition means for, when the flickering period of said light projection means is longer than a predetermined period, inhibiting transition to the passive mode.

21. The apparatus according to claim 20, wherein when said inhibition means inhibits transition to the passive mode, said distance measuring means outputs a pre-stored predetermined value as calculation result.

22. The apparatus according to claim 20, further comprising:
   continuous operation setting means for continuously operating said distance measuring means; and
   flickering frequency limiting means for, when said continuous operation setting means sets to continuously operate said distance measuring means, inhibiting a flickering frequency of said light projection means from being set to be lower than a predetermined value.

23. The apparatus according to claim 20, wherein said distance measuring means comprises a circulating shift register for cumulatively adding signal charges until a predetermined number of rounds or a predetermined signal level is reached.

24. The apparatus according to claim 20, wherein said detection means detects brightness of the object.

25. A distance measuring apparatus, which comprises light projection means driven to flicker and project light beam pulses onto an object, and distance measuring means for measuring a distance to the object on the basis of reflected light obtained by projecting the light beam pulses onto the object, comprising:
   detection means for detecting a situation of the object;
   flickering frequency changing means for changing a flickering frequency of said light projection means in accordance with the situation of the object detected by said detection means;
   continuous operation setting means for continuously operating said distance measuring means; and
   flickering frequency limiting means for, when said continuous operation setting means sets to continuously operate said distance measuring means, inhibiting a flickering frequency of said light projection means from being set to be lower than a predetermined value.

26. The apparatus according to claim 25, wherein said distance measuring means comprises a circulating shift register for cumulatively adding signal charges until a predetermined number of rounds or a predetermined signal level is reached.

27. The apparatus according to claim 25, wherein said detection means detects brightness of the object.

* * * * *

UNITED STATES PATENT AND TRADEMARK OFFICE
CERTIFICATE OF CORRECTION

PATENT NO. : 5,963,308
DATED : October 5, 1999
INVENTOR(S) : Minoru Taskaski et al.

It is certified that error appears in the above-identified patent and that said Letters Patent is hereby corrected as shown below:

Column 7, line 57, delete "views f or" and insert therefor -- views for--.

Column 16, line 30, delete "Xr and X1" and insert therefor -- Xr and X$\ell$ --.

Column 16, line 31, delete "Xr and X1" and insert therefor -- Xr and X$\ell$ --.

Column 16, line 46, delete "208R, X1" and insert therefor -- 208R, X$\ell$ --.

Column 16, line 55, Equation (2), delete "D/(B+K)=f/(X1-$\Delta$X)" and insert therefor -- D/(B+K)=f/(X$\ell$-.$\Delta$X) --

Column 16, line 60, Equation (3), delete "D=Bxf/(X1-Xr) and insert therefor -- D=Bxf/(X$\ell$ -Xr) --

Column 16, line 63, delete "Xr and X1" and insert therefor -- Xr and X$\ell$ --.

Column 20, line 41, delete "rand pe" and insert therefor -- release --.

Column 23, line 27, delete "(X1-Xr) and insert therefor -- (X$\ell$-Xr) --.

Signed and Sealed this

Tenth Day of April, 2001

NICHOLAS P. GODICI

Attest:

Attesting Officer

Acting Director of the United States Patent and Trademark Office